United States Patent
Hughes et al.

(10) Patent No.: US 11,757,740 B2
(45) Date of Patent: Sep. 12, 2023

(54) AGGREGATION OF SELECT NETWORK TRAFFIC STATISTICS

(71) Applicant: HEWLETT PACKARD ENTERPRISE DEVELOPMENT LP, Houston, TX (US)

(72) Inventors: David Anthony Hughes, Los Altos Hills, CA (US); Pawan Kumar Singh, Los Altos, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 0 days.

(21) Appl. No.: 17/161,286

(22) Filed: Jan. 28, 2021

(65) Prior Publication Data
US 2021/0152445 A1 May 20, 2021

Related U.S. Application Data

(63) Continuation of application No. 16/581,637, filed on Sep. 24, 2019, now abandoned, which is a
(Continued)

(51) Int. Cl.
*H04L 43/062* (2022.01)
*H04L 43/045* (2022.01)
(Continued)

(52) U.S. Cl.
CPC .......... *H04L 43/062* (2013.01); *G06F 16/22* (2019.01); *G06F 16/248* (2019.01);
(Continued)

(58) Field of Classification Search
CPC ... H04L 43/062; H04L 43/026; H04L 43/045; H04L 43/067; G06F 16/22; G06F 16/284; G06F 16/248
See application file for complete search history.

(56) References Cited

U.S. PATENT DOCUMENTS

| | | | |
|---|---|---|---|
| 4,494,108 A | 1/1985 | Langdon et al. |
| 4,558,302 A | 12/1985 | Welch |

(Continued)

FOREIGN PATENT DOCUMENTS

| | | |
|---|---|---|
| EP | 1507353 A2 | 2/2005 |
| JP | 05-061964 A | 3/1993 |
| WO | 01/35226 A1 | 5/2001 |

OTHER PUBLICATIONS

Notice of Allowance, dated Jan. 3, 2014, U.S. Appl. No. 13/757,548, filed Feb. 1, 2013.

(Continued)

*Primary Examiner* — Joseph L Greene
(74) *Attorney, Agent, or Firm* — Sheppard Mullin Richter & Hampton LLP

(57) ABSTRACT

Disclosed herein are network information collectors, methods, computer-readable media, and systems for generating network traffic statistics. For example, the network appliance is to receive, via a network, an accumulating map from a network appliance device, wherein the accumulating map comprises a condensed and aggregated version of web traffic flow information to the network appliance device; receive, via the network, additional accumulating maps from other network appliance devices; populate an accumulation map database with the accumulating map and the additional accumulating maps; and generate a report of the network traffic statistics hosted by the network appliance device and the other network appliance devices.

20 Claims, 9 Drawing Sheets

BEFORE EVICTION

| | Bytes rx | Packets rx |
|---|---|---|
| " /sampledomain1/computer1/port1 " | 101765 | 965 |
| " /sampledomain2/computer2/port2 " | 76551 | 727 |
| " /sampledomain1/computer1/port2 " | 85001 | 803 |

AFTER EVICTION

| | Bytes rx | Packets rx |
|---|---|---|
| " /sampledomain1/computer1/* " | 186766 | 1768 |
| " /sampledomain2/computer2/port2 " | 76551 | 727 |

Related U.S. Application Data continuation of application No. 15/180,981, filed on Jun. 13, 2016, now Pat. No. 10,432,484.

(51) Int. Cl.
*H04L 43/067* (2022.01)
*G06F 16/22* (2019.01)
*G06F 16/248* (2019.01)
*G06F 16/28* (2019.01)
*H04L 43/026* (2022.01)

(52) U.S. Cl.
CPC .......... *G06F 16/284* (2019.01); *H04L 43/026* (2013.01); *H04L 43/045* (2013.01); *H04L 43/067* (2013.01)

(56) References Cited

U.S. PATENT DOCUMENTS

| | | |
|---|---|---|
| 4,612,532 A | 9/1986 | Bacon et al. |
| 5,023,611 A | 6/1991 | Chamzas et al. |
| 5,159,452 A | 10/1992 | Kinoshita et al. |
| 5,243,341 A | 9/1993 | Seroussi et al. |
| 5,307,413 A | 4/1994 | Denzer |
| 5,357,250 A | 10/1994 | Healey et al. |
| 5,359,720 A | 10/1994 | Tamura et al. |
| 5,373,290 A | 12/1994 | Lempel et al. |
| 5,483,556 A | 1/1996 | Pillan et al. |
| 5,532,693 A | 7/1996 | Winters et al. |
| 5,592,613 A | 1/1997 | Miyazawa et al. |
| 5,602,831 A | 2/1997 | Gaskill |
| 5,608,540 A | 3/1997 | Ogawa |
| 5,611,049 A | 3/1997 | Pitts |
| 5,627,533 A | 5/1997 | Clark |
| 5,635,932 A | 6/1997 | Shinagawa et al. |
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Libove et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel, III et al. |
| 6,054,943 A | 4/2000 | Lawrence |
| 6,081,883 A | 6/2000 | Popelka et al. |
| 6,084,855 A | 7/2000 | Soirinsuo et al. |
| 6,175,944 B1 | 1/2001 | Urbanke et al. |
| 6,191,710 B1 | 2/2001 | Waletzki |
| 6,240,463 B1 | 5/2001 | Benmohamed et al. |
| 6,295,541 B1 | 9/2001 | Bodnar et al. |
| 6,308,148 B1 | 10/2001 | Bruins et al. |
| 6,311,260 B1 | 10/2001 | Stone et al. |
| 6,339,616 B1 | 1/2002 | Kovalev |
| 6,374,266 B1 | 4/2002 | Shnelvar |
| 6,434,191 B1 | 8/2002 | Agrawal et al. |
| 6,434,641 B1 | 8/2002 | Haupt et al. |
| 6,434,662 B1 | 8/2002 | Greene et al. |
| 6,438,664 B1 | 8/2002 | McGrath et al. |
| 6,452,915 B1 | 9/2002 | Jorgensen |
| 6,463,001 B1 | 10/2002 | Williams |
| 6,489,902 B2 | 12/2002 | Heath |
| 6,493,698 B1 | 12/2002 | Beylin |
| 6,570,511 B1 | 5/2003 | Cooper |
| 6,587,985 B1 | 7/2003 | Fukushima et al. |
| 6,614,368 B1 | 9/2003 | Cooper |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne et al. |
| 6,674,769 B1 | 1/2004 | Viswanath |
| 6,718,361 B1 | 4/2004 | Basani et al. |
| 6,728,840 B1 | 4/2004 | Shatil et al. |
| 6,738,379 B1 | 5/2004 | Balazinski et al. |
| 6,754,181 B1 | 6/2004 | Elliott et al. |
| 6,769,048 B2 | 7/2004 | Goldberg et al. |
| 6,791,945 B1 | 9/2004 | Levenson et al. |
| 6,842,424 B1 | 1/2005 | Key et al. |
| 6,856,651 B2 | 2/2005 | Singh |
| 6,859,842 B1 | 2/2005 | Nakamichi et al. |
| 6,862,602 B2 | 3/2005 | Guha |
| 6,910,106 B2 | 6/2005 | Sechrest et al. |
| 6,963,980 B1 | 11/2005 | Mattsson |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagarajan et al. |
| 7,035,214 B1 | 4/2006 | Seddigh et al. |
| 7,047,281 B1 | 5/2006 | Kausik |
| 7,069,268 B1 | 6/2006 | Burns et al. |
| 7,069,342 B1 | 6/2006 | Biederman |
| 7,110,407 B1 | 9/2006 | Khanna |
| 7,111,005 B1 | 9/2006 | Wessman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,149,953 B2 | 12/2006 | Cameron et al. |
| 7,177,295 B1 | 2/2007 | Sholander et al. |
| 7,197,597 B1 | 3/2007 | Scheid et al. |
| 7,200,847 B2 | 4/2007 | Straube et al. |
| 7,215,667 B1 | 5/2007 | Davis |
| 7,216,283 B2 | 5/2007 | Shen et al. |
| 7,242,681 B1 | 7/2007 | Van et al. |
| 7,243,094 B2 | 7/2007 | Tabellion et al. |
| 7,266,645 B2 | 9/2007 | Garg et al. |
| 7,278,016 B1 | 10/2007 | Detrick et al. |
| 7,318,100 B2 | 1/2008 | Demmer et al. |
| 7,359,393 B1 | 4/2008 | Nalawade et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie et al. |
| 7,389,393 B1 | 6/2008 | Karr et al. |
| 7,417,570 B2 | 8/2008 | Srinivasan et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,496,659 B1 | 2/2009 | Coverdill et al. |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,587,401 B2 | 9/2009 | Yeo et al. |
| 7,596,802 B2 | 9/2009 | Border et al. |
| 7,617,436 B2 | 11/2009 | Wenger et al. |
| 7,619,545 B2 | 11/2009 | Samuels et al. |
| 7,620,870 B2 | 11/2009 | Srinivasan et al. |
| 7,624,333 B2 | 11/2009 | Langner |
| 7,624,446 B1 | 11/2009 | Wilhelm |
| 7,630,295 B2 | 12/2009 | Hughes et al. |
| 7,633,942 B2 | 12/2009 | Bearden et al. |
| 7,639,700 B1 | 12/2009 | Nabhan et al. |
| 7,643,426 B1 | 1/2010 | Lee et al. |
| 7,644,230 B1 | 1/2010 | Hughes et al. |
| 7,676,554 B1 | 3/2010 | Malmskog et al. |
| 7,698,431 B1 | 4/2010 | Hughes |
| 7,702,843 B1 | 4/2010 | Chen et al. |
| 7,714,747 B2 | 5/2010 | Fallon |
| 7,746,781 B1 | 6/2010 | Xiang |
| 7,764,606 B1 | 7/2010 | Ferguson et al. |

(56) References Cited

U.S. PATENT DOCUMENTS

| | | |
|---|---|---|
| 7,810,155 B1 | 10/2010 | Ravi |
| 7,826,798 B2 | 11/2010 | Stephens et al. |
| 7,827,237 B2 | 11/2010 | Plamondon |
| 7,849,134 B2 | 12/2010 | McCanne et al. |
| 7,853,699 B2 | 12/2010 | Wu et al. |
| 7,873,786 B1 | 1/2011 | Singh et al. |
| 7,917,599 B1 | 3/2011 | Gopalan et al. |
| 7,925,711 B1 | 4/2011 | Gopalan et al. |
| 7,941,606 B1 | 5/2011 | Pullela et al. |
| 7,945,736 B2 | 5/2011 | Hughes et al. |
| 7,948,921 B1 | 5/2011 | Hughes et al. |
| 7,953,869 B2 | 5/2011 | Demmer et al. |
| 7,957,307 B2 | 6/2011 | Qiu et al. |
| 7,970,898 B2 | 6/2011 | Clubb et al. |
| 7,975,018 B2 | 7/2011 | Unrau et al. |
| 8,069,225 B2 | 11/2011 | McCanne et al. |
| 8,072,985 B2 | 12/2011 | Golan et al. |
| 8,090,027 B2 | 1/2012 | Schneider |
| 8,095,774 B1 | 1/2012 | Hughes et al. |
| 8,140,757 B1 | 3/2012 | Singh et al. |
| 8,171,238 B1 | 5/2012 | Hughes et al. |
| 8,209,334 B1 | 6/2012 | Doerner |
| 8,225,072 B2 | 7/2012 | Hughes et al. |
| 8,271,325 B2 | 9/2012 | Silverman et al. |
| 8,271,847 B2 | 9/2012 | Langner |
| 8,307,115 B1 | 11/2012 | Hughes |
| 8,312,226 B2 | 11/2012 | Hughes |
| 8,352,608 B1 | 1/2013 | Keagy et al. |
| 8,370,583 B2 | 2/2013 | Hughes |
| 8,386,797 B1 | 2/2013 | Danilak |
| 8,392,684 B2 | 3/2013 | Hughes |
| 8,442,052 B1 | 5/2013 | Hughes |
| 8,447,740 B1 | 5/2013 | Huang et al. |
| 8,473,714 B2 | 6/2013 | Hughes et al. |
| 8,489,562 B1 | 7/2013 | Hughes et al. |
| 8,516,158 B1 | 8/2013 | Wu et al. |
| 8,527,544 B1 | 9/2013 | Colgrove et al. |
| 8,553,757 B2 | 10/2013 | Florencio et al. |
| 8,565,118 B2 | 10/2013 | Shukla et al. |
| 8,576,816 B2 | 11/2013 | Lamy-Bergot et al. |
| 8,595,314 B1 | 11/2013 | Hughes |
| 8,613,071 B2 | 12/2013 | Day et al. |
| 8,681,614 B1 | 3/2014 | McCanne et al. |
| 8,699,490 B2 | 4/2014 | Zheng et al. |
| 8,700,771 B1 | 4/2014 | Ramankutty et al. |
| 8,706,947 B1 | 4/2014 | Vincent |
| 8,725,988 B2 | 5/2014 | Hughes et al. |
| 8,732,423 B1 | 5/2014 | Hughes |
| 8,738,865 B1 | 5/2014 | Hughes et al. |
| 8,743,683 B1 | 6/2014 | Hughes |
| 8,755,381 B2 | 6/2014 | Hughes et al. |
| 8,775,413 B2 | 7/2014 | Brown et al. |
| 8,811,431 B2 | 8/2014 | Hughes |
| 8,843,627 B1 | 9/2014 | Baldi et al. |
| 8,850,324 B2 | 9/2014 | Clemm et al. |
| 8,885,632 B2 | 11/2014 | Hughes et al. |
| 8,891,554 B2 | 11/2014 | Biehler |
| 8,929,380 B1 | 1/2015 | Hughes et al. |
| 8,929,402 B1 | 1/2015 | Hughes |
| 8,930,650 B1 | 1/2015 | Hughes et al. |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,106,530 B1 | 8/2015 | Wang |
| 9,130,991 B2 | 9/2015 | Hughes |
| 9,131,510 B2 | 9/2015 | Wang |
| 9,143,455 B1 | 9/2015 | Hughes |
| 9,152,574 B2 | 10/2015 | Hughes et al. |
| 9,171,251 B2 | 10/2015 | Camp et al. |
| 9,191,342 B2 | 11/2015 | Hughes et al. |
| 9,202,304 B1 | 12/2015 | Baenziger et al. |
| 9,253,277 B2 | 2/2016 | Hughes et al. |
| 9,306,818 B2 | 4/2016 | Aumann et al. |
| 9,307,442 B2 | 4/2016 | Bachmann et al. |
| 9,363,248 B1 | 6/2016 | Hughes |
| 9,363,309 B2 | 6/2016 | Hughes |
| 9,380,094 B2 | 6/2016 | Florencio et al. |
| 9,384,203 B1 | 7/2016 | Seiver et al. |
| 9,397,951 B1 | 7/2016 | Hughes |
| 9,438,538 B2 | 9/2016 | Hughes et al. |
| 9,549,048 B1 | 1/2017 | Hughes |
| 9,584,403 B2 | 2/2017 | Hughes et al. |
| 9,584,414 B2 | 2/2017 | Sung et al. |
| 9,613,071 B1 | 4/2017 | Hughes |
| 9,626,224 B2 | 4/2017 | Hughes et al. |
| 9,647,949 B2 | 5/2017 | Varki et al. |
| 9,712,463 B1 | 7/2017 | Hughes et al. |
| 9,716,644 B2 | 7/2017 | Wei et al. |
| 9,717,021 B2 | 7/2017 | Hughes et al. |
| 9,875,344 B1 | 1/2018 | Hughes et al. |
| 9,906,630 B2 | 2/2018 | Hughes |
| 9,948,496 B1 | 4/2018 | Hughes et al. |
| 9,961,010 B2 | 5/2018 | Hughes et al. |
| 9,967,056 B1 | 5/2018 | Hughes |
| 10,091,172 B1 | 10/2018 | Hughes |
| 10,164,861 B2 | 12/2018 | Hughes et al. |
| 10,257,082 B2 | 4/2019 | Hughes |
| 10,313,930 B2 | 6/2019 | Hughes et al. |
| 10,326,551 B2 | 6/2019 | Hughes |
| 10,432,484 B2 | 10/2019 | Hughes et al. |
| 10,956,324 B1 | 3/2021 | Giles et al. |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0009079 A1 | 1/2002 | Jungck |
| 2002/0010702 A1 | 1/2002 | Ajtai et al. |
| 2002/0010765 A1 | 1/2002 | Border |
| 2002/0035628 A1* | 3/2002 | Gil ............... H04L 63/1416 709/224 |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0099691 A1 | 7/2002 | Lore et al. |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1 | 9/2002 | Zhang et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0159454 A1 | 10/2002 | Delmas |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0033307 A1 | 2/2003 | Davis et al. |
| 2003/0046572 A1 | 3/2003 | Newman et al. |
| 2003/0048750 A1 | 3/2003 | Kobayashi |
| 2003/0067940 A1 | 4/2003 | Edholm |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0085894 A1 | 5/2004 | Wang et al. |
| 2004/0086114 A1 | 5/2004 | Rarick |
| 2004/0088376 A1 | 5/2004 | McCanne et al. |
| 2004/0114569 A1 | 6/2004 | Naden et al. |

(56) References Cited

U.S. PATENT DOCUMENTS

| | | |
|---|---|---|
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0215626 A1 * | 10/2004 | Colossi .............. G06F 16/22 |
| 2004/0243571 A1 | 12/2004 | Judd |
| 2004/0250027 A1 | 12/2004 | Heflinger |
| 2004/0255048 A1 | 12/2004 | Lev et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer et al. |
| 2005/0055399 A1 | 3/2005 | Savchuk |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132044 A1 | 6/2005 | Guingo et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0182849 A1 | 8/2005 | Chandrayana et al. |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Sécurest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0010243 A1 | 1/2006 | DuRee |
| 2006/0013210 A1 | 1/2006 | Bordogna et al. |
| 2006/0026425 A1 | 2/2006 | Douceur et al. |
| 2006/0028999 A1 | 2/2006 | Iakobashvili et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0123035 A1 * | 6/2006 | Ivie .............. H03M 7/30 |
| 2006/0136913 A1 | 6/2006 | Sameske |
| 2006/0143497 A1 | 6/2006 | Zohar et al. |
| 2006/0193247 A1 | 8/2006 | Naseh et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | Van et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De et al. |
| 2007/0174428 A1 | 7/2007 | Lev et al. |
| 2007/0179900 A1 | 8/2007 | Daase et al. |
| 2007/0192863 A1 | 8/2007 | Kapoor et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0263554 A1 | 11/2007 | Finn |
| 2007/0276983 A1 | 11/2007 | Zohar et al. |
| 2007/0280245 A1 | 12/2007 | Rosberg |
| 2007/0289017 A1 | 12/2007 | Copeland, III |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0037432 A1 | 2/2008 | Cohen et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0285463 A1 | 11/2008 | Oran |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter et al. |
| 2009/0089048 A1 | 4/2009 | Pouzin |
| 2009/0092137 A1 | 4/2009 | Haigh et al. |
| 2009/0100483 A1 | 4/2009 | McDowell |
| 2009/0158417 A1 | 6/2009 | Khanna et al. |
| 2009/0168786 A1 | 7/2009 | Sarkar et al. |
| 2009/0175172 A1 | 7/2009 | Prytz et al. |
| 2009/0182864 A1 | 7/2009 | Khan et al. |
| 2009/0204961 A1 | 8/2009 | Dehaan et al. |
| 2009/0228474 A1 | 9/2009 | Chiu et al. |
| 2009/0234966 A1 | 9/2009 | Samuels et al. |
| 2009/0245114 A1 | 10/2009 | Vijayaraghavan |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085891 A1 | 4/2010 | Kind et al. |
| 2010/0085964 A1 | 4/2010 | Weir et al. |
| 2010/0088670 A1 | 4/2010 | Paster |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0128615 A1 * | 5/2010 | Monk .............. H04L 43/026 |
| | | 370/252 |
| 2010/0131957 A1 | 5/2010 | Kami |

(56) References Cited

U.S. PATENT DOCUMENTS

| | | |
|---|---|---|
| 2010/0150158 A1 | 6/2010 | Cathey et al. |
| 2010/0169467 A1 | 7/2010 | Shukla et al. |
| 2010/0177663 A1 | 7/2010 | Johansson et al. |
| 2010/0225658 A1 | 9/2010 | Coleman |
| 2010/0232443 A1 | 9/2010 | Pandey |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0333212 A1 | 12/2010 | Carpenter et al. |
| 2011/0002346 A1 | 1/2011 | Wu |
| 2011/0022812 A1 | 1/2011 | Van et al. |
| 2011/0113472 A1 | 5/2011 | Fung et al. |
| 2011/0154169 A1 | 6/2011 | Gopal et al. |
| 2011/0154329 A1 | 6/2011 | Arcese et al. |
| 2011/0179037 A1 | 7/2011 | Mizuguchi et al. |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0258049 A1 | 10/2011 | Ramer et al. |
| 2011/0261828 A1 | 10/2011 | Smith |
| 2011/0276963 A1 | 11/2011 | Wu et al. |
| 2011/0299537 A1 | 12/2011 | Saraiya et al. |
| 2012/0005549 A1 | 1/2012 | Ichiki et al. |
| 2012/0036325 A1 | 2/2012 | Mashtizadeh et al. |
| 2012/0051234 A1 | 3/2012 | Gintis et al. |
| 2012/0069131 A1 | 3/2012 | Abelow |
| 2012/0147894 A1 | 6/2012 | Mulligan et al. |
| 2012/0162265 A1 | 6/2012 | Heinrich et al. |
| 2012/0173759 A1 | 7/2012 | Agarwal et al. |
| 2012/0185775 A1 | 7/2012 | Clemm et al. |
| 2012/0198346 A1 | 8/2012 | Clemm et al. |
| 2012/0218130 A1 | 8/2012 | Boettcher et al. |
| 2012/0221611 A1 | 8/2012 | Watanabe et al. |
| 2012/0230345 A1 | 9/2012 | Ovsiannikov |
| 2012/0239872 A1 | 9/2012 | Hughes et al. |
| 2012/0290636 A1 | 11/2012 | Kadous et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1 | 2/2013 | Casado et al. |
| 2013/0058354 A1 | 3/2013 | Casado et al. |
| 2013/0080619 A1 | 3/2013 | Assuncao et al. |
| 2013/0083806 A1 | 4/2013 | Suarez et al. |
| 2013/0086236 A1 | 4/2013 | Baucke et al. |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1 | 5/2013 | Padmanabhan et al. |
| 2013/0141259 A1 | 6/2013 | Hazarika et al. |
| 2013/0142050 A1 | 6/2013 | Luna |
| 2013/0163594 A1 | 6/2013 | Sharma et al. |
| 2013/0250951 A1 | 9/2013 | Koganti |
| 2013/0263125 A1 | 10/2013 | Shamsee et al. |
| 2013/0266007 A1 | 10/2013 | Kumbhare et al. |
| 2013/0282970 A1 | 10/2013 | Hughes et al. |
| 2013/0325986 A1 | 12/2013 | Brady et al. |
| 2013/0343191 A1 | 12/2013 | Kim et al. |
| 2014/0052864 A1 | 2/2014 | Van et al. |
| 2014/0075554 A1 | 3/2014 | Cooley |
| 2014/0086069 A1* | 3/2014 | Frey .................... H04L 43/026 370/252 |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1 | 5/2014 | Vank et al. |
| 2014/0157142 A1* | 6/2014 | Heinrich ............ H04L 67/1095 715/744 |
| 2014/0181381 A1 | 6/2014 | Hughes et al. |
| 2014/0222736 A1 | 8/2014 | Drew |
| 2014/0250166 A1 | 9/2014 | Desai |
| 2014/0269705 A1 | 9/2014 | Decusatis et al. |
| 2014/0279078 A1 | 9/2014 | Nukala et al. |
| 2014/0321290 A1 | 10/2014 | Jin et al. |
| 2014/0379937 A1 | 12/2014 | Hughes et al. |
| 2015/0058488 A1 | 2/2015 | Backholm |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0110113 A1 | 4/2015 | Levy et al. |
| 2015/0120663 A1 | 4/2015 | Le et al. |
| 2015/0124825 A1 | 5/2015 | Dharmapurikar et al. |
| 2015/0143505 A1 | 5/2015 | Border et al. |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0312054 A1 | 10/2015 | Barabash et al. |
| 2015/0334210 A1 | 11/2015 | Hughes |
| 2015/0363478 A1 | 12/2015 | Haynes |
| 2015/0365293 A1 | 12/2015 | Madrigal et al. |
| 2015/0370723 A1 | 12/2015 | Nambiar et al. |
| 2016/0014051 A1 | 1/2016 | Hughes et al. |
| 2016/0034305 A1* | 2/2016 | Shear .................... G06F 16/248 707/722 |
| 2016/0093193 A1 | 3/2016 | Silvers et al. |
| 2016/0112255 A1 | 4/2016 | Li |
| 2016/0218947 A1 | 7/2016 | Hughes et al. |
| 2016/0255000 A1 | 9/2016 | Gattani et al. |
| 2016/0255542 A1 | 9/2016 | Hughes et al. |
| 2016/0357587 A1* | 12/2016 | Yadav .................... H04L 43/10 |
| 2016/0359708 A1 | 12/2016 | Gandham et al. |
| 2016/0359740 A1 | 12/2016 | Parandehgheibi et al. |
| 2016/0359872 A1* | 12/2016 | Yadav ................ H04L 63/1408 |
| 2016/0373292 A1 | 12/2016 | Sigoure |
| 2016/0380886 A1 | 12/2016 | Blair et al. |
| 2017/0026467 A1 | 1/2017 | Barsness et al. |
| 2017/0070445 A1 | 3/2017 | Zhang et al. |
| 2017/0111692 A1 | 4/2017 | An et al. |
| 2017/0149679 A1 | 5/2017 | Hughes et al. |
| 2017/0187581 A1 | 6/2017 | Hughes et al. |
| 2017/0359238 A1 | 12/2017 | Hughes et al. |
| 2018/0089994 A1 | 3/2018 | Dhondse et al. |
| 2018/0121634 A1 | 5/2018 | Hughes et al. |
| 2018/0123861 A1 | 5/2018 | Hughes et al. |
| 2018/0131711 A1 | 5/2018 | Chen et al. |
| 2018/0205494 A1 | 7/2018 | Hughes |
| 2018/0227216 A1 | 8/2018 | Hughes |
| 2018/0227223 A1 | 8/2018 | Hughes |
| 2019/0089620 A1 | 3/2019 | Hefel et al. |
| 2019/0104207 A1 | 4/2019 | Goel et al. |
| 2019/0149447 A1 | 5/2019 | Hughes et al. |
| 2019/0230038 A1 | 7/2019 | Hughes |
| 2019/0245771 A1 | 8/2019 | Wu et al. |
| 2019/0253187 A1 | 8/2019 | Hughes |
| 2019/0260683 A1 | 8/2019 | Hughes |
| 2019/0274070 A1 | 9/2019 | Hughes et al. |
| 2019/0280917 A1 | 9/2019 | Hughes et al. |

OTHER PUBLICATIONS

Notice of Allowance, dated Jul. 27, 2015, U.S. Appl. No. 14/549,425, filed Nov. 20, 2014.

Notice of Allowance, dated Jun. 10, 2014, U.S. Appl. No. 11/498,491, filed Aug. 2, 2006.

Notice of Allowance, dated Jun. 3, 2015, U.S. Appl. No. 14/548,195, filed Nov. 19, 2014.

Notice of Allowance, dated Jun. 3, 2016, U.S. Appl. No. 14/859,179, filed Sep. 18, 2015.

Notice of Allowance, dated Mar. 16, 2012, U.S. Appl. No. 12/151,839, filed May 8, 2008.

Notice of Allowance, dated Mar. 16, 2015, U.S. Appl. No. 14/190,940, filed Feb. 26, 2014.

Notice of Allowance, dated Mar. 2, 2016, U.S. Appl. No. 14/677,841, filed Apr. 2, 2015.

Notice of Allowance, dated Mar. 21, 2013, U.S. Appl. No. 12/070,796, filed Feb. 20, 2008.

Notice of Allowance, dated Mar. 22, 2017, U.S. Appl. No. 13/621,534, filed Sep. 17, 2012.

Notice of Allowance, dated Mar. 23, 2017, U.S. Appl. No. 15/091,533, filed Apr. 5, 2016.

Notice of Allowance, dated Mar. 26, 2012, U.S. Appl. No. 13/112,936, filed May 20, 2011.

(56) References Cited

OTHER PUBLICATIONS

Notice of Allowance, dated May 14, 2013, U.S. Appl. No. 11/998,726, filed Nov. 30, 2007.
Notice of Allowance, dated May 21, 2015, U.S. Appl. No. 13/274,162, filed Oct. 14, 2011.
Notice of Allowance, dated Nov. 12, 2011, U.S. Appl. No. 11/825,497, filed Jul. 5, 2007.
Notice of Allowance, dated Nov. 25, 2013, U.S. Appl. No. 13/917,517, filed Jun. 13, 2013.
Notice of Allowance, dated Oct. 23, 2012, U.S. Appl. No. 11/202,697, filed Aug. 12, 2005.
Notice of Allowance, dated Oct. 25, 2017, U.S. Appl. No. 14/447,505, filed Jul. 30, 2014.
Notice of Allowance, dated Oct. 5, 2015, U.S. Appl. No. 14/734,949, filed Jun. 9, 2015.
Notice of Allowance, dated Oct. 6, 2014, U.S. Appl. No. 14/270,101, filed May 5, 2014.
Notice of Allowance, dated Sep. 12, 2014, U.S. Appl. No. 13/657,733, filed Oct. 22, 2012.
Notice of Allowance, dated Sep. 26, 2013, U.S. Appl. No. 13/517,575, filed Jun. 13, 2012.
Notice of Allowance, dated Sep. 5, 2014, U.S. Appl. No. 14/248,229, filed Apr. 8, 2014.
Notice of Allowance, dated Sep. 5, 2017, U.S. Appl. No. 14/811,482, filed Jul. 28, 2015.
Notice of Allowance, dated Sep. 8, 2009, U.S. Appl. No. 11/263,755, filed Oct. 31, 2005.
Notice of Allowance, dated Sep. 8, 2017, U.S. Appl. No. 14/479,131, filed Sep. 5, 2014.
Petitione's Demonstratives, Feb. 3, 2015, Inter Partes Review Case No. IPR2014-00245.
Request for Trial Granted, dated Jan. 2, 2014, U.S. Appl. No. 11/202,697, filed Aug. 12, 2005.
Request for Trial Granted, dated Jan. 2, 2014, U.S. Appl. No. 11/240,110, filed Sep. 29, 2005.
Request for Trial Granted, dated Jun. 11, 2014, U.S. Appl. No. 11/497,026, filed Jul. 31, 2006.
Riverbed, "Riverbed Awarded Patent on Core WDS Technology" (available at: http://www.riverbed.com/about/news-articles/pressreleases/riverbed-awarde- d-patent-on-core-wds-technology.html (last visited Aug. 8, 2014)), 2 pages.
Riverbed, "Riverbed Introduces Market-Leading WDS Solutions for Disaster Recovery and Business Application Acceleration" (available at http://www.riverbed.com/about/news-articles/pressreleases/riverbed-introd-uces-market-leading-wds-solutions-fordisaster-recovery-and-business-applic- ation-acceleration.html (last visited Aug. 8, 2014)), 4 pages.
Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)), pp. 1-18.
Silver Peak Systems, "The Benefits of Byte-level WAN Deduplication" (2008), pp. 1-5.
Singh et al. ; "Future of Internet Security—IPSEC"; 2005; pp. 1-8.
Spring et al., "A protocol-independent technique for eliminating redundant network traffic", ACM SIGCOMM Computer Communication Review, vol. 30, Issue 4 (Oct. 2000) pp. 87-95, Year of Publication: 2000.
Supplemental Notice of Allowability, dated Oct. 9, 2014, U.S. Appl. No. 13/657,733, filed Oct. 22, 2012.
Tseng, Josh, "When accelerating secure traffic is not secure" (available at http://www.riverbed.com/blogs/whenaccelerati.html?&isSearch=true&pageS- ize=3&page=2 (last visited Aug. 8, 2014)), 3 pages.
You, L. L. and Karamanolis, C. 2004. "Evaluation of efficient archival storage techniques", In Proceedings of the 21st IEEE Symposium on Mass Storage Systems and Technologies (MSST), pp. 1-6.
You, L. L. et al., "Deep Store an Archival Storage System Architecture" Data Engineering, 2005. ICDE 2005. Proceedings of the 21st Intl. Conf. on Data Eng.,Tokyo, Japan, Apr. 5-8, 2005, pp. 12.
Final Office Action, dated Jan. 11, 2013, U.S. Appl. No. 13/517,575, filed Jun. 13, 2012.
Final Office Action, dated Jan. 11, 2016, U.S. Appl. No. 13/288,691, filed Nov. 3, 2011.
Final Office Action, dated Jan. 12, 2009, U.S. Appl. No. 11/202,697, filed Aug. 12, 2005.
Final Office Action, dated Jan. 12, 2015, U.S. Appl. No. 13/274,162, filed Oct. 14, 2011.
Final Office Action, dated Jan. 14, 2014, U.S. Appl. No. 12/313,618, filed Nov. 20, 2008.
Final Office Action, dated Jan. 22, 2008, U.S. Appl. No. 11/240,110, filed Sep. 29, 2005.
Final Office Action, dated Jan. 5, 2009, U.S. Appl. No. 11/240,110, filed Sep. 29, 2005.
Final Office Action, dated Jan. 9, 2008, U.S. Appl. No. 11/497,026, filed Jul. 31, 2006.
Final Office Action, dated Jul. 13, 2010, U.S. Appl. No. 11/498,491, filed Aug. 2, 2006.
Final Office Action, dated Jul. 14, 2015, U.S. Appl. No. 13/482,321, filed May 29, 2012.
Final Office Action, dated Jul. 17, 2013, U.S. Appl. No. 13/427,422, filed Mar. 22, 2012.
Final Office Action, dated Jul. 22, 2010, U.S. Appl. No. 11/998,726, filed Nov. 30, 2007.
Final Office Action, dated Jul. 26, 2016, U.S. Appl. No. 14/477,804, filed Sep. 4, 2014.
Final Office Action, dated Mar. 16, 2012, U.S. Appl. No. 11/498,473, filed Aug. 2, 2006.
Final Office Action, dated Mar. 25, 2014, U.S. Appl. No. 11/498,491, filed Aug. 2, 2006.
Final Office Action, dated Mar. 30, 2011, U.S. Appl. No. 11/285,816, filed Nov. 22, 2005.
Final Office Action, dated May 11, 2009, U.S. Appl. No. 11/263,755, filed Oct. 31, 2005.
Final Office Action, dated May 14, 2010, U.S. Appl. No. 12/217,440, filed Jul. 3, 2008.
Final Office Action, dated May 25, 2012, U.S. Appl. No. 12/313,618, filed Nov. 20, 2008.
Final Office Action, dated May 3, 2017, U.S. Appl. No. 14/479,131, filed Sep. 5, 2014.
Final Office Action, dated May 5, 2010, U.S. Appl. No. 11/903,416, filed Sep. 20, 2007.
Final Office Action, dated Nov. 2, 2012, U.S. Appl. No. 13/427,422, filed Mar. 22, 2012.
Final Office Action, dated Nov. 20, 2012, U.S. Appl. No. 12/217,440, filed Jul. 3, 2008.
Final Office Action, dated Nov. 4, 2010, U.S. Appl. No. 11/825,497, filed Jul. 5, 2007.
Final Office Action, dated Nov. 9, 2010, U.S. Appl. No. 11/998,726, filed Nov. 30, 2007.
Final Office Action, dated Oct. 12, 2010, U.S. Appl. No. 11/825,440, filed Jul. 5, 2007.
Final Office Action, dated Oct. 12, 2011, U.S. Appl. No. 12/151,839, filed May 8, 2008.
Final Office Action, dated Oct. 13, 2011, U.S. Appl. No. 11/998,726, filed Nov. 30, 2007.
Final Office Action, dated Oct. 5, 2017, U.S. Appl. No. 15/148,933, filed May 6, 2016.
Final Office Action, dated Sep. 1, 2009, U.S. Appl. No. 11/498,491, filed Aug. 2, 2006.
Final Office Action, dated Sep. 18, 2015, U.S. Appl. No. 14/477,804, filed Sep. 4, 2014.
Final Office Action, dated Sep. 23, 2010, U.S. Appl. No. 12/151,839, filed May 8, 2008.
Final Office Action, dated Sep. 26, 2013, U.S. Appl. No. 13/288,691, filed Nov. 3, 2011.
Final Office Action, dated Sep. 30, 2011, U.S. Appl. No. 11/825,440, filed Jul. 5, 2007.
Final Written Decision, dated Dec. 30, 2014, Inter Partes Review Case No. IPR2013-00402, pp. 1-37.

(56) References Cited

OTHER PUBLICATIONS

Final Written Decision, dated Dec. 30, 2014, Inter Partes Review Case No. IPR2013-00403, pp. 1-38.
Final Written Decision, dated Jun. 9, 2015, Inter Partes Review Case No. IPR2014-00245, pp. 1-40.
Hong, B et al. "Duplicate data elimination in a SAN file system", In Proceedings of the 21st Symposium on Mass Storage Systems (MSS '04), Goddard, MD, Apr. 2004. IEEE, pp. 101-114.
Knutsson, Bjorn et al., "Transparent Proxy Signalling", Journal of Communications and Networks, vol. 3, No. 2, Jun. 2001, pp. 164-174.
Manber, Udi, "Finding Similar Files in a Large File System", TR 93-33 Oct. 1994, Department of Computer Science, University of Arizona. <http://webglimpse.net/pubs/TR93-33.pdf>. Also appears in the 1994 winter USENIX Technical Conference.
Muthitacharoen, Athicha et al., "A Low-bandwidth Network File System," 2001, in Proc, of the 18th ACM Symposium on Operating Systems Principles, Banff, Canada, pp. 174-187.
Newton, "Newton's Telecom Dictionary", 17th Ed., 2001, pp. 38, 201, and 714.
Non-Final Office Action, dated Apr. 2, 2013, U.S. Appl. No. 13/427,422, filed Mar. 22, 2012.
Non-Final Office Action, dated Apr. 27, 2017, U.S. Appl. No. 14/447,505, filed Jul. 30, 2014.
Non-Final Office Action, dated Aug. 11, 2015, U.S. Appl. No. 14/677,841, filed Apr. 2, 2015.
Non-Final Office Action, dated Aug. 12, 2010, U.S. Appl. No. 12/313,618, filed Nov. 20, 2008.
Non-Final Office Action, dated Aug. 14, 2013, U.S. Appl. No. 12/217,440, filed Jul. 3, 2008.
Non-Final Office Action, dated Aug. 14, 2013, U.S. Appl. No. 13/917,517, filed Jun. 13, 2013.
Non-Final Office Action, dated Aug. 18, 2015, U.S. Appl. No. 14/543,781, filed Nov. 17, 2014.
Non-Final Office Action, dated Aug. 24, 2007, U.S. Appl. No. 11/202,697, filed Aug. 12, 2005.
Non-Final Office Action, dated Mar. 22, 2010, U.S. Appl. No. 11/285,816, filed Nov. 22, 2005.
Non-Final Office Action, dated Mar. 24, 2009, U.S. Appl. No. 11/285,816, filed Nov. 22, 2005.
Non-Final Office Action, dated Mar. 8, 2011, U.S. Appl. No. 12/313,618, filed Nov. 20, 2008.
Non-Final Office Action, dated May 13, 2011, U.S. Appl. No. 11/825,440, filed Jul. 5, 2007.
Non-Final Office Action, dated May 18, 2015, U.S. Appl. No. 14/679,965, filed Apr. 6, 2015.
Non-Final Office Action, dated May 20, 2013, U.S. Appl. No. 13/288,691, filed Nov. 3, 2011.
Non-Final Office Action, dated May 24, 2010, U.S. Appl. No. 11/825,440, filed Jul. 5, 2007.
Non-Final Office Action, dated May 3, 2016, U.S. Appl. No. 14/679,965, filed Apr. 6, 2015.
Non-Final Office Action, dated May 4, 2017, U.S. Appl. No. 14/811,482, filed Jul. 28, 2015.
Non-Final Office Action, dated May 6, 2015, U.S. Appl. No. 14/477,804, filed Sep. 4, 2014.
Non-Final Office Action, dated May 6, 2016, U.S. Appl. No. 13/288,691, filed Nov. 3, 2011.
Non-Final Office Action, dated Nov. 17, 2008, U.S. Appl. No. 11/263,755, filed Oct. 31, 2005.
Non-Final Office Action, dated Nov. 2, 2017, U.S. Appl. No. 15/403,116, filed Jan. 10, 2017.
Non-Final Office Action, dated Nov. 26, 2014, U.S. Appl. No. 14/333,486, filed Jul. 16, 2014.
Non-Final Office Action, dated Nov. 6, 2012, U.S. Appl. No. 11/998,726, filed Nov. 30, 2007.
Non-Final Office Action, dated Oct. 1, 2014, U.S. Appl. No. 14/190,940, filed Feb. 26, 2014.
Non-Final Office Action, dated Oct. 13, 2010, U.S. Appl. No. 11/285,816, filed Nov. 22, 2005.
Non-Final Office Action, dated Oct. 20, 2009, U.S. Appl. No. 11/285,816, filed Nov. 22, 2005.
Non-Final Office Action, dated Oct. 22, 2013, U.S. Appl. No. 13/274,162, filed Oct. 14, 2011.
Non-Final Office Action, dated Oct. 4, 2011, U.S. Appl. No. 12/313,618, filed Nov. 20, 2008.
Non-Final Office Action, dated Oct. 7, 2010, U.S. Appl. No. 12/217,440, filed Jul. 3, 2008.
Non-Final Office Action, dated Oct. 9, 2013, U.S. Appl. No. 11/498,491, filed Aug. 2, 2006.
Non-Final Office Action, dated Sep. 10, 2013, U.S. Appl. No. 13/757,548, filed Feb. 1, 2013.
Non-Final Office Action, dated Sep. 11, 2017, U.S. Appl. No. 15/148,671, filed May 6, 2016.
Non-Final Office Action, dated Sep. 13, 2012, U.S. Appl. No. 11/498,473, filed Aug. 2, 2006.
Non-Final Office Action, dated Sep. 17, 2008, U.S. Appl. No. 11/357,657, filed Feb. 16, 2006.
Non-Final Office Action, dated Sep. 20, 2012, U.S. Appl. No. 13/517,575, filed Jun. 13, 2012.
Non-Final Office Action, dated Sep. 22, 2011, U.S. Appl. No. 12/217,440, filed Jul. 3, 2008.
Non-Final Office Action, dated Sep. 25, 2012, U.S. Appl. No. 11/498,491, filed Aug. 2, 2006.
Non-Final Office Action, dated Sep. 26, 2008, U.S. Appl. No. 11/285,816, filed Nov. 22, 2005.
Non-Final Office Action, dated Sep. 27, 2011, U.S. Appl. No. 13/112,936, filed May 20, 2011.
Notice of Allowance, dated Apr. 14, 2014, U.S. Appl. No. 12/313,618, filed Nov. 20, 2008.
Notice of Allowance, dated Apr. 21, 2011, U.S. Appl. No. 11/825,497, filed Jul. 5, 2007.
Notice of Allowance, dated Apr. 28, 2009, U.S. Appl. No. 11/357,657, filed Feb. 16, 2006.
Notice of Allowance, dated Aug. 30, 2012, U.S. Appl. No. 11/240,110, filed Sep. 29, 2005.
Notice of Allowance, dated Aug. 31, 2009, U.S. Appl. No. 11/724,800, filed Mar. 15, 2007.
Notice of Allowance, dated Dec. 22, 2014, U.S. Appl. No. 14/333,486, filed Jul. 16, 2014.
Notice of Allowance, dated Dec. 26, 2012, U.S. Appl. No. 11/497,026, filed Jul. 31, 2006.
Notice of Allowance, dated Dec. 3, 2009, U.S. Appl. No. 11/796,239, filed Apr. 27, 2007.
Notice of Allowance, dated Dec. 9, 2010, U.S. Appl. No. 12/622,324, filed Nov. 19, 2009.
Notice of Allowance, dated Feb. 11, 2011, U.S. Appl. No. 11/903,416, filed Sep. 20, 2007.
Notice of Allowance, dated Feb. 14, 2014, U.S. Appl. No. 11/498,473, filed Aug. 2, 2006.
Notice of Allowance, dated Feb. 16, 2016, U.S. Appl. No. 14/248,167, filed Apr. 8, 2014.
Notice of Allowance, dated Feb. 19, 2013, U.S. Appl. No. 13/482,321, filed May 29, 2012.
Notice of Allowance, dated Feb. 29, 2012, U.S. Appl. No. 11/825,440, filed Jul. 5, 2007.
Notice of Allowance, dated Feb. 8, 2016, U.S. Appl. No. 14/543,781, filed Nov. 17, 2014.
Notice of Allowance, dated Jan. 16, 2014, U.S. Appl. No. 12/217,440, filed Jul. 3, 2008.
Notice of Allowance, dated Jan. 2, 2014, U.S. Appl. No. 13/427,422, filed Mar. 22, 2012.
Notice of Allowance, dated Jan. 20, 2011, U.S. Appl. No. 12/622,324, filed Nov. 19, 2009.
Notice of Allowance, dated Jan. 23, 2015, U.S. Appl. No. 14/248,188, filed Apr. 8, 2014.
"Decision Granting Motion to Terminate", Inter Partes Review Case No. IPR2014-00245, Feb. 7, 2018, 4 pages.
"IPsec Anti-Replay Window: Expanding and Disabling," Cisco IOS Security Configuration Guide. 2005-2006 Cisco Systems, Inc. Last updated: Sep. 12, 2006, 14 pages.

(56) References Cited

OTHER PUBLICATIONS

"Notice of Entry of Judgement Accompanied by Opinion", United States Court of Appeals for the Federal Circuit, Case: 15-2072, Oct. 24, 2017, 6 pages.
"Shared LAN Cache Datasheet", 1996, <http://www.lancache.com/slcdata.htm>, 8 pages.
Advisory Action, dated Apr. 4, 2013, U.S. Appl. No. 13/517,575, filed Jun. 13, 2012.
Advisory Action, dated Aug. 20, 2012, U.S. Appl. No. 12/313,618, filed Nov. 20, 2008.
Advisory Action, dated Dec. 3, 2013, U.S. Appl. No. 13/288,691, filed Nov. 3, 2011.
Advisory Action, dated Jan. 24, 2013, U.S. Appl. No. 13/427,422, filed Mar. 22, 2012.
Advisory Action, dated Jan. 29, 2013, U.S. Appl. No. 12/217,440, filed Jul. 3, 2008.
Advisory Action, dated Jul. 16, 2013, U.S. Appl. No. 11/498,491, filed Aug. 2, 2006.
Advisory Action, dated Jul. 2, 2012, U.S. Appl. No. 12/217,440, filed Jul. 3, 2008.
Advisory Action, dated Jun. 27, 2014, U.S. Appl. No. 13/274,162, filed Oct. 14, 2011.
Advisory Action, dated Mar. 21, 2016, U.S. Appl. No. 14/679,965, filed Apr. 6, 2015.
Advisory Action, dated Mar. 25, 2015, U.S. Appl. No. 13/274,162, filed Oct. 14, 2011.
Advisory Action, dated Mar. 5, 2015, U.S. Appl. No. 13/288,691, filed Nov. 3, 2011.
Advisory Action, dated May 23, 2011, U.S. Appl. No. 11/998,726, filed Nov. 30, 2007.
Advisory Action, dated Nov. 25, 2011, U.S. Appl. No. 11/498,491, filed Aug. 2, 2006.
Advisory Action, dated Nov. 25, 2015, U.S. Appl. No. 13/482,321, filed May 29, 2012.
Advisory Action, dated Oct. 2, 2009, U.S. Appl. No. 11/498,473, filed Aug. 2, 2006.
Advisory Action, dated Sep. 27, 2013, U.S. Appl. No. 13/427,422, filed Mar. 22, 2012.
Business Wire, "Silver Peak Systems Delivers Family of Appliances for Enterprise-Wide Centralization of Branch Office Infrastructure; Innovative Local Instance Networking Approach Overcomes Traditional Application Acceleration Pitfalls" (available at http://www.businesswire.com/news/home/20050919005450/en/Silver-Peak-Systems-Delivers-Family-Appliances-Enterprise-Wide#.UVzkPk7u-1 (last visited Aug. 8, 2014)), pp. 1-4.
Corrected Notice of Allowability, dated Aug. 5, 2015, U.S. Appl. No. 14/248,188, filed Apr. 8, 2014.
Corrected Notice of Allowability, dated Mar. 14, 2016, U.S. Appl. No. 14/677,841, filed Apr. 2, 2015.
Corrected Notice of Allowability, dated Mar. 7, 2016, U.S. Appl. No. 14/543,781, filed Nov. 17, 2014.
Decision on Appeal, dated Jun. 28, 2012, U.S. Appl. No. 11/240,110, filed Sep. 29, 2005.
Decision on Appeal, dated Nov. 14, 2012, U.S. Appl. No. 11/497,026, filed Jul. 31, 2006.
Decision on Appeal, dated Sep. 17, 2012, U.S. Appl. No. 11/202,697, filed Aug. 12, 2005.
Definition memory (n), Webster's Third New International Dictionary, Unabridged (1993), available at <http://lionreference.chadwyck.com> (Dictionaries/Webster's Dictionary). IPR2013-00402 proceedings.
Douglis, F. et al., "Application specific Delta-encoding via Resemblance Detection", Published in the 2003 USENIX Annual Technical Conference, pp. 1-14.
Examiner's Answer to Appeal Brief, dated Oct. 14, 2009, U.S. Appl. No. 11/497,026, filed Jul. 31, 2006.
Examiner's Answer to Appeal Brief, dated Oct. 27, 2009, U.S. Appl. No. 11/202,697, filed Aug. 12, 2005.
Examiner's Answer to Appeal Brief, dated Oct. 27, 2009, U.S. Appl. No. 11/240,110, filed Sep. 29, 2005.
Final Office Action, dated Apr. 1, 2014, U.S. Appl. No. 13/274,162, filed Oct. 14, 2011.
Final Office Action, dated Apr. 15, 2013, U.S. Appl. No. 11/498,491, filed Aug. 2, 2006.
Final Office Action, dated Apr. 18, 2012, U.S. Appl. No. 12/217,440, filed Jul. 3, 2008.
Final Office Action, dated Apr. 23, 2012, U.S. Appl. No. 11/998,726, filed Nov. 30, 2007.
Final Office Action, dated Aug. 12, 2011, U.S. Appl. No. 11/498,473, filed Aug. 2, 2006.
Final Office Action, dated Aug. 17, 2011, U.S. Appl. No. 11/498,491, filed Aug. 2, 2006.
Final Office Action, dated Aug. 7, 2009, U.S. Appl. No. 11/498,473, filed Aug. 2, 2006.
Final Office Action, dated Dec. 18, 2014, U.S. Appl. No. 13/288,691, filed Nov. 3, 2011.
Final Office Action, dated Dec. 21, 2015, U.S. Appl. No. 14/679,965, filed Apr. 6, 2015.
Final Office Action, dated Dec. 31, 2008, U.S. Appl. No. 11/497,026, filed Jul. 31, 2006.
Final Office Action, dated Dec. 8, 2010, U.S. Appl. No. 12/070,796, filed Feb. 20, 2008.
Final Office Action, dated Feb. 1, 2013, U.S. Appl. No. 12/070,796, filed Feb. 20, 2008.
Final Office Action, dated Feb. 10, 2012, U.S. Appl. No. 12/070,796, filed Feb. 20, 2008.
Final Office Action, dated Feb. 17, 2017, U.S. Appl. No. 15/148,933, filed May 6, 2016.
Final Office Action, dated Feb. 22, 2008, U.S. Appl. No. 11/202,697, filed Aug. 12, 2005.
Final Office Action, dated Feb. 22, 2012, U.S. Appl. No. 13/112,936, filed May 20, 2011.
Final Office Action, dated Feb. 3, 2011, U.S. Appl. No. 12/217,440, filed Jul. 3, 2008.
Final Office Action, dated Feb. 4, 2013, U.S. Appl. No. 11/498,473, filed Aug. 2, 2006.
Non-Final Office Action, dated Aug. 24, 2007, U.S. Appl. No. 11/240,110, filed Sep. 29, 2005.
Non-Final Office Action, dated Aug. 24, 2007, U.S. Appl. No. 11/497,026, filed Jul. 31, 2006.
Non-Final Office Action, dated Aug. 28, 2012, U.S. Appl. No. 12/070,796, filed Feb. 20, 2008.
Non-Final Office Action, dated Dec. 1, 2011, U.S. Appl. No. 11/998,726, filed Nov. 30, 2007.
Non-Final Office Action, dated Dec. 15, 2015, U.S. Appl. No. 14/479,131, filed Sep. 5, 2014.
Non-Final Office Action, dated Dec. 16, 2015, U.S. Appl. No. 14/859,179, filed Sep. 18, 2015.
Non-Final Office Action, dated Dec. 20, 2011, U.S. Appl. No. 11/498,473, filed Aug. 2, 2006.
Non-Final Office Action, dated Dec. 30, 2011, U.S. Appl. No. 11/825,440, filed Jul. 5, 2007.
Non-Final Office Action, dated Dec. 31, 2014, U.S. Appl. No. 13/621,534, filed Sep. 17, 2012.
Non-Final Office Action, dated Dec. 6, 2010, U.S. Appl. No. 11/498,473, filed Aug. 2, 2006.
Non-Final Office Action, dated Dec. 9, 2009, U.S. Appl. No. 11/825,497, filed Jul. 5, 2007.
Non-Final Office Action, dated Feb. 2, 2010, U.S. Appl. No. 11/498,491, filed Aug. 2, 2006.
Non-Final Office Action, dated Feb. 3, 2010, U.S. Appl. No. 11/998,726, filed Nov. 30, 2007.
Non-Final Office Action, dated Feb. 3, 2011, U.S. Appl. No. 12/151,839, filed May 8, 2008.
Non-Final Office Action, dated Feb. 4, 2010, U.S. Appl. No. 12/070,796, filed Feb. 20, 2008.
Non-Final Office Action, dated Jan. 12, 2016, U.S. Appl. No. 14/477,804, filed Sep. 4, 2014.
Non-Final Office Action, dated Jan. 22, 2009, U.S. Appl. No. 11/498,473, filed Aug. 2, 2006.
Non-Final Office Action, dated Jan. 23, 2015, U.S. Appl. No. 14/548,195, filed Nov. 19, 2014.

(56) References Cited

OTHER PUBLICATIONS

Non-Final Office Action, dated Jan. 26, 2009, U.S. Appl. No. 11/498,491, filed Aug. 2, 2006.
Non-Final Office Action, dated Jan. 26, 2010, U.S. Appl. No. 11/903,416, filed Sep. 20, 2007.
Non-Final Office Action, dated Jan. 3, 2013, U.S. Appl. No. 13/482,321, filed May 29, 2012.
Non-Final Office Action, dated Jan. 4, 2011, U.S. Appl. No. 11/498,491, filed Aug. 2, 2006.
Non-Final Office Action, dated Jan. 6, 2010, U.S. Appl. No. 12/217,440, filed Jul. 3, 2008.
Non-Final Office Action, dated Jul. 1, 2013, U.S. Appl. No. 12/313,618, filed Nov. 20, 2008.
Non-Final Office Action, dated Jul. 10, 2008, U.S. Appl. No. 11/240,110, filed Sep. 29, 2005.
Non-Final Office Action, dated Jul. 10, 2013, U.S. Appl. No. 11/498,473, filed Aug. 2, 2006.
Non-Final Office Action, dated Jul. 11, 2014, U.S. Appl. No. 14/248,188, filed Apr. 8, 2014.
Non-Final Office Action, dated Jul. 15, 2015, U.S. Appl. No. 14/734,949, filed Jun. 9, 2015.
Non-Final Office Action, dated Jul. 17, 2008, U.S. Appl. No. 11/202,697, filed Aug. 12, 2005.
Non-Final Office Action, dated Jul. 18, 2011, U.S. Appl. No. 11/285,816, filed Nov. 22, 2005.
Non-Final Office Action, dated Jul. 18, 2012, U.S. Appl. No. 12/217,440, filed Jul. 3, 2008.
Non-Final Office Action, dated Jul. 21, 2010, U.S. Appl. No. 12/070,796, filed Feb. 20, 2008.
Non-Final Office Action, dated Jul. 25, 2016, U.S. Appl. No. 14/067,619, filed Oct. 30, 2013.
Non-Final Office Action, dated Jul. 27, 2017, U.S. Appl. No. 14/981,814, filed Dec. 28, 2015.
Non-Final Office Action, dated Jul. 30, 2014, U.S. Appl. No. 13/274,162, filed Oct. 14, 2011.
Non-Final Office Action, dated Jul. 5, 2012, U.S. Appl. No. 13/427,422, filed Mar. 22, 2012.
Non-Final Office Action, dated Jul. 7, 2011, U.S. Appl. No. 12/070,796, filed Feb. 20, 2008.
Non-Final Office Action, dated Jul. 8, 2008, U.S. Appl. No. 11/497,026, filed Jul. 31, 2006.
Non-Final Office Action, dated Jun. 13, 2014, U.S. Appl. No. 13/288,691, filed Nov. 3, 2011.
Non-Final Office Action, dated Jun. 14, 2010, U.S. Appl. No. 12/151,839, filed May 8, 2008.
Non-Final Office Action, dated Jun. 15, 2016, U.S. Appl. No. 15/091,533, filed Apr. 5, 2016.
Non-Final Office Action, dated Jun. 17, 2010, U.S. Appl. No. 12/622,324, filed Nov. 19, 2009.
Non-Final Office Action, dated Jun. 18, 2010, U.S. Appl. No. 11/825,497, filed Jul. 5, 2007.
Non-Final Office Action, dated Jun. 2, 2015, U.S. Appl. No. 13/288,691, filed Nov. 3, 2011.
Non-Final Office Action, dated Jun. 20, 2017, U.S. Appl. No. 15/148,933, filed May 6, 2016.
Non-Final Office Action, dated Jun. 22, 2009, U.S. Appl. No. 11/796,239, filed Apr. 27, 2007.
Non-Final Office Action, dated Jun. 22, 2016, U.S. Appl. No. 14/447,505, filed Jul. 30, 2014.
Non-Final Office Action, dated Jun. 6, 2014, U.S. Appl. No. 14/190,940, filed Feb. 26, 2014.
Non-Final Office Action, dated Jun. 8, 2015, U.S. Appl. No. 14/248,167, filed Apr. 8, 2014.
Non-Final Office Action, dated Mar. 11, 2015, U.S. Appl. No. 14/549,425, filed Nov. 20, 2014.

\* cited by examiner

400 → "/domain name/computer/port"

| | Bytes rx | Packets rx | |
|---|---|---|---|
| 410 "/sampledomain1/computer1/port1" | 101765 | 965 | Row 1 |
| 420 "/sampledomain2/computer2/port2" | 76551 | 727 | Row 2 |
| 430 "/sampledomain1/computer1/port2" | 85001 | 803 | Row 3 |
| ... | ... | ... | |
| 440 "/sampledomainA/computerB/portC" | D | E | Row F |

450 → "/sourceIP/destinationIP"

| | Bytes rx | Packets rx |
|---|---|---|
| 460 "/111.11.10.110/222.20.22.200" | 5467 | 248 |
| 470 "/111.11.10.110/333.30.33.300" | 432 | 126 |
| ... | ... | ... |

FIG. 4A

BEFORE EVICTION

|  | Bytes rx | Packets rx |
|---|---|---|
| " /sampledomain1/computer1/port1 " | 101765 | 965 |
| " /sampledomain2/computer2/port2 " | 76551 | 727 |
| " /sampledomain1/computer1/port2 " | 85001 | 803 |

AFTER EVICTION

|  | Bytes rx | Packets rx |
|---|---|---|
| " /sampledomain1/computer1/* " | 186766 | 1768 |
| " /sampledomain2/computer2/port2 " | 76551 | 727 | ced
AGGREGATION OF SELECT NETWORK TRAFFIC STATISTICS

CROSS-REFERENCE TO RELATED APPLICATIONS

The present application is a Continuation application and claims the priority benefit of the U.S. patent application Ser. No. 16/581,637 filed Sep. 24, 2019, which is a Continuation application and claims the priority benefit of the U.S. patent application Ser. No. 15/180,981 filed on Jun. 13, 2016 and issued as U.S. Pat. No. 10,432,484 on Oct. 1, 2019. The disclosure of the above-referenced application is incorporated herein by reference in its entirety for all purposes.

TECHNICAL FIELD

This disclosure relates generally to the collection, aggregation, and processing of network traffic statistics for a plurality of network appliances.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

An increasing number of network appliances, physical and virtual, are deployed in communication networks such as wide area networks (WAN). For each network appliance, it may be desirable to monitor attributes and statistics of the data traffic handled by the device. For example, information can be collected regarding source IP addresses, destination IP addresses, traffic type, port numbers, etc. for the traffic that passes through the network appliance. Typically this information is collected for each data flow using industry standards such as NetFlow and IPFIX. The collected data is transported across the network to a collection engine, stored in a database, and can be utilized for running queries and generating reports regarding the network.

Since there can be any number of data flows processed by a network appliance each minute (hundreds, thousands, or even millions), this results in a large volume of data that is collected each minute, for each network appliance. As the number of network appliances in a communication network increases, the amount of data generated can quickly become unmanageable. Moreover, transporting all of this data across the network from each network appliance to the collection engine can be a significant burden, as well as storing and maintaining a database with all of the data. Further, it may take longer to run a query and generate a report since the amount of data to be processed and analyzed is so large.

Thus, there is a need for a more efficient mechanism for collecting and storing network traffic statistics for a large number of network appliances in a communication network.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Various exemplary network appliances, methods, computer-readable media, and systems of the present disclosure for aggregating network traffic statistics are disclosed. The network information collector to receive, via a network, an accumulating map from a network appliance device, wherein the accumulating map comprises a condensed and aggregated version of web traffic flow information to the network appliance device; receive, via the network, additional accumulating maps from other network appliance devices; populate an accumulation map database with the accumulating map and the additional accumulating maps; and generate a report of the network traffic statistics hosted by the network appliance device and the other network appliance devices.

Other features, examples, and embodiments are described below.

BRIEF DESCRIPTION OF THE DRAWINGS

Embodiments are illustrated by way of example and not by limitation in the figures of the accompanying drawings, in which like references indicate similar elements.

FIG. 4A depicts an exemplary accumulating map at a network appliance.

DETAILED DESCRIPTION

The following detailed description includes references to the accompanying drawings, which form a part of the detailed description. The drawings show illustrations, in accordance with exemplary embodiments. These exemplary embodiments, which are also referred to herein as II examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms II a" and II an" are used, as is common in patent documents, to include one or more than one. In this document, the term II or" is used to refer to a nonexclusive II or," such that II A or B" includes II A but not B," 11 B but not A," and II A and B," unless otherwise indicated.

The embodiments disclosed herein may be implemented using a variety of technologies. For example, the methods described herein may be implemented in software executing on a computer system containing one or more computers, or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to the collection, aggregation, and processing of network traffic statistics for a plurality of network appliances.

Figure 1A:
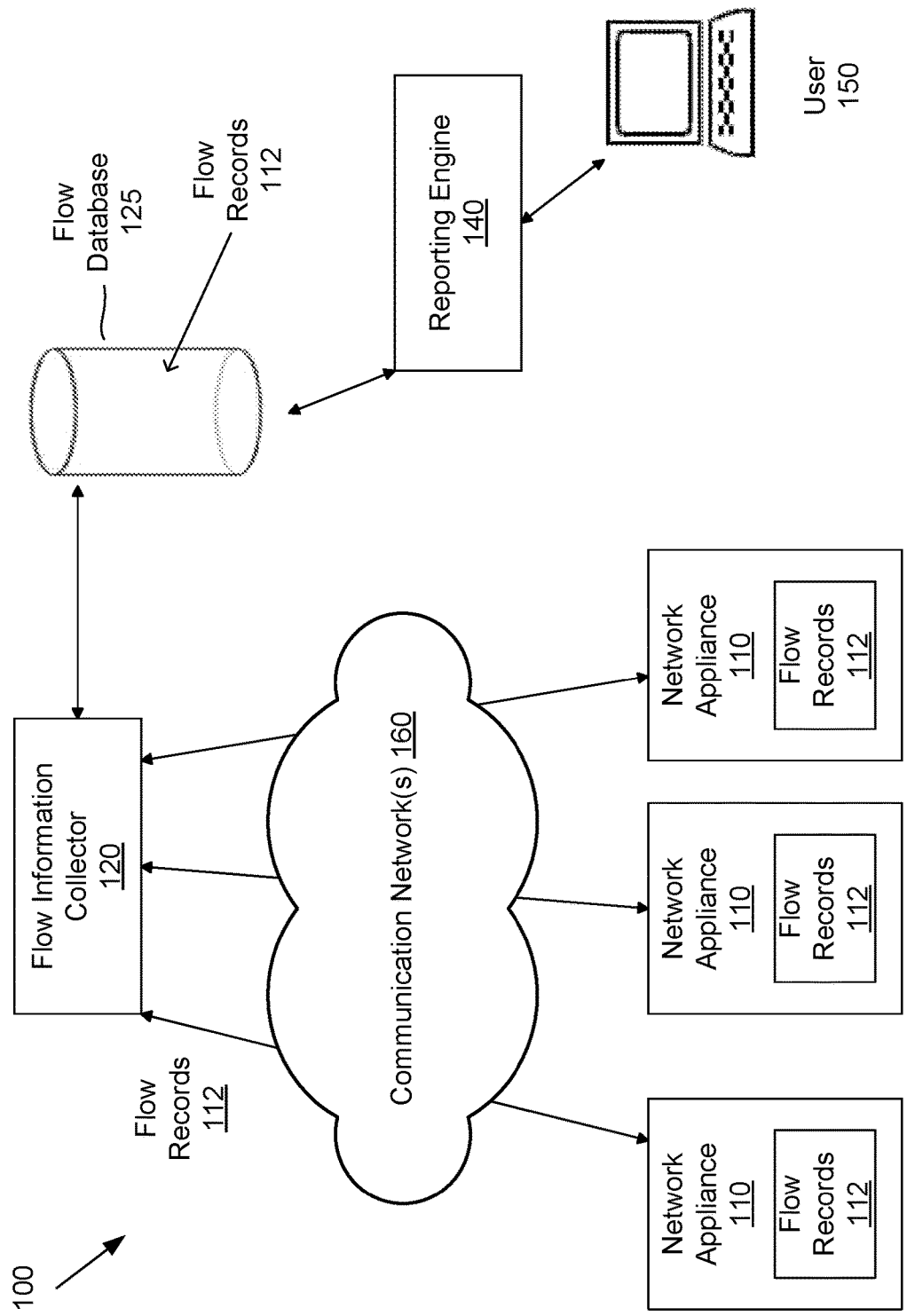
FIG. 1A depicts an exemplary system of the prior art.

FIG. 1A depicts an exemplary system 100 within which embodiments of the prior art are implemented. The system comprises a plurality of network appliances 110 in communication with a flow information collector 120 over one or more wired or wireless communication network(s) 160. The flow information collector 120 is further in communication with one or more flow database(s) 125, which in turn is in communication with a reporting engine 140 that is accessible by a user 150.

Network appliance 110 collects information about network flows that are processed through the appliance and maintains flow records 112. These flow records are transmitted to the flow information collector 120 and maintained in flow database 125. User 150 can access information from these flow records 112 via reporting engine 140.

Figure 1B:
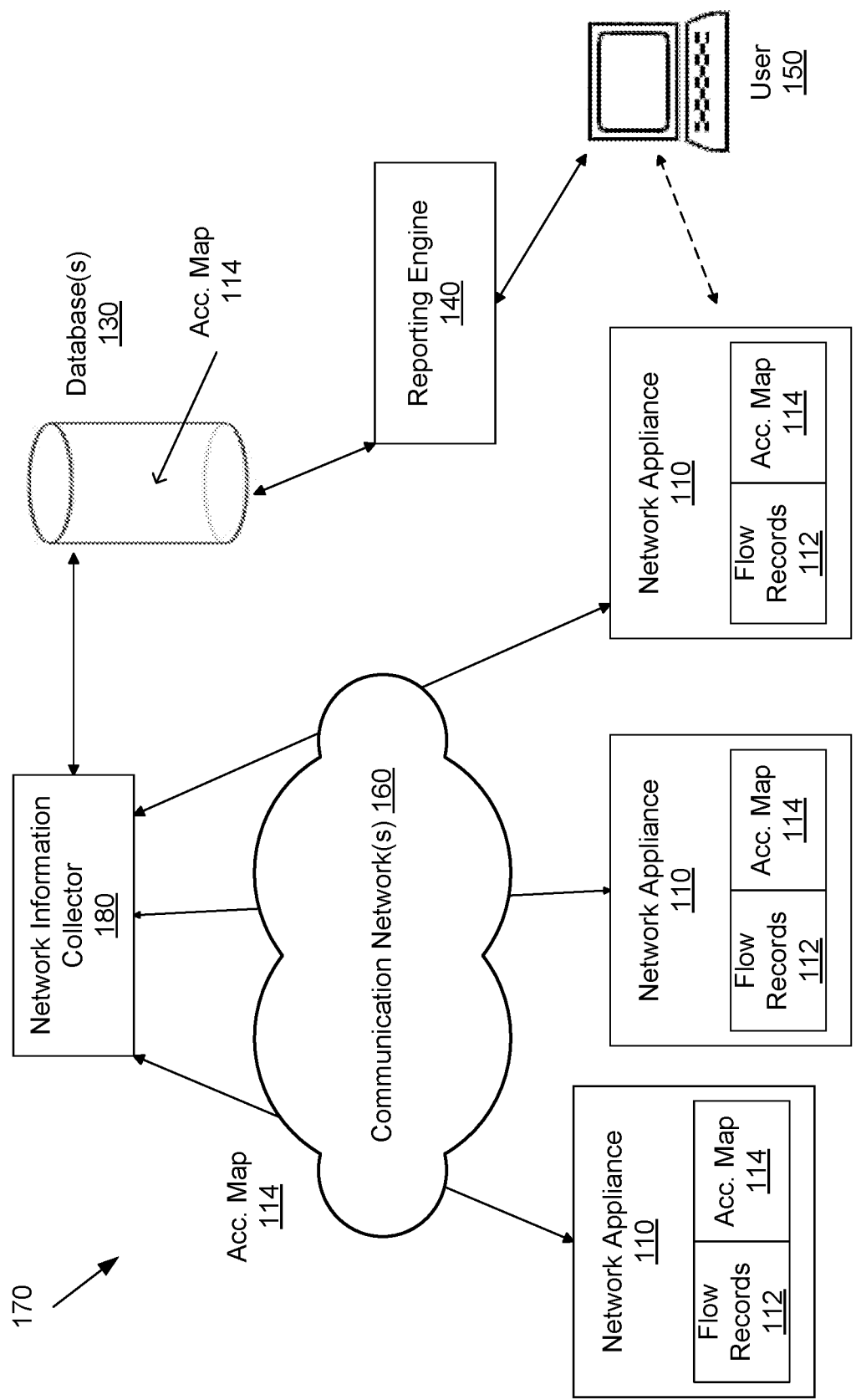
FIG. 1B depicts an exemplary system within which the present disclosure can be implemented.

FIG. 1B depicts an exemplary system 170 within which the present disclosure can be implemented. The system comprises a plurality of network appliances 110 in communication with a network information collector 180 over one or more wired or wireless communication network(s) 160. The network information collector 180 is further in communication with one or more database(s) 130, which in turn is in communication with a reporting engine 140 that is accessible by a user 150. While network information collector 180, database(s) 130, and reporting engine 140 are depicted in the figure as separate, one or more of these engines can be part of the same computing machine or distributed across many computers.

In a wide area network, there can be multiple network appliances deployed in one or more geographic locations. Each network appliance 110 comprises hardware and/or software elements configured to receive data and optionally perform any type of processing, including but not limited to, WAN optimization techniques to the data, before transmitting to another appliance. In various embodiments, the network appliance 110 can be configured as an additional router or gateway. If a network appliance has multiple interfaces, it can be transparent on some interfaces, and act like a router/bridge on others. Alternatively, the network appliance can be transparent on all interfaces, or appear as a router/bridge on all interfaces. In some embodiments, network traffic can be intercepted by another device and mirrored (copied) onto network appliance 110. The network appliance 110 may further be either physical or virtual. A virtual network appliance can be in a virtual private cloud (not shown), managed by a cloud service provider, such as Amazon Web Services, or others.

Network appliance 110 collects information about network flows that are processed through the appliance in flow records 112. From these flow records 112, network appliance 110 further generates an accumulating map 114 containing select information from many flow records 112 aggregated over a certain time period. The flow records 112 and accumulating map 114 generated at network appliance 110 are discussed in further detail below with respect to FIGS. 3 and 4.

At certain time intervals, network appliance 110 transmits information from the accumulating map 114 (and not flow records 112) to network information collector 180 and maintains this information in one or more database(s) 130.

User 150 can access information from these accumulating maps via reporting engine 140, or in some instances user 150 can access information from these accumulating maps directly from a network appliance 110.

Figure 2:
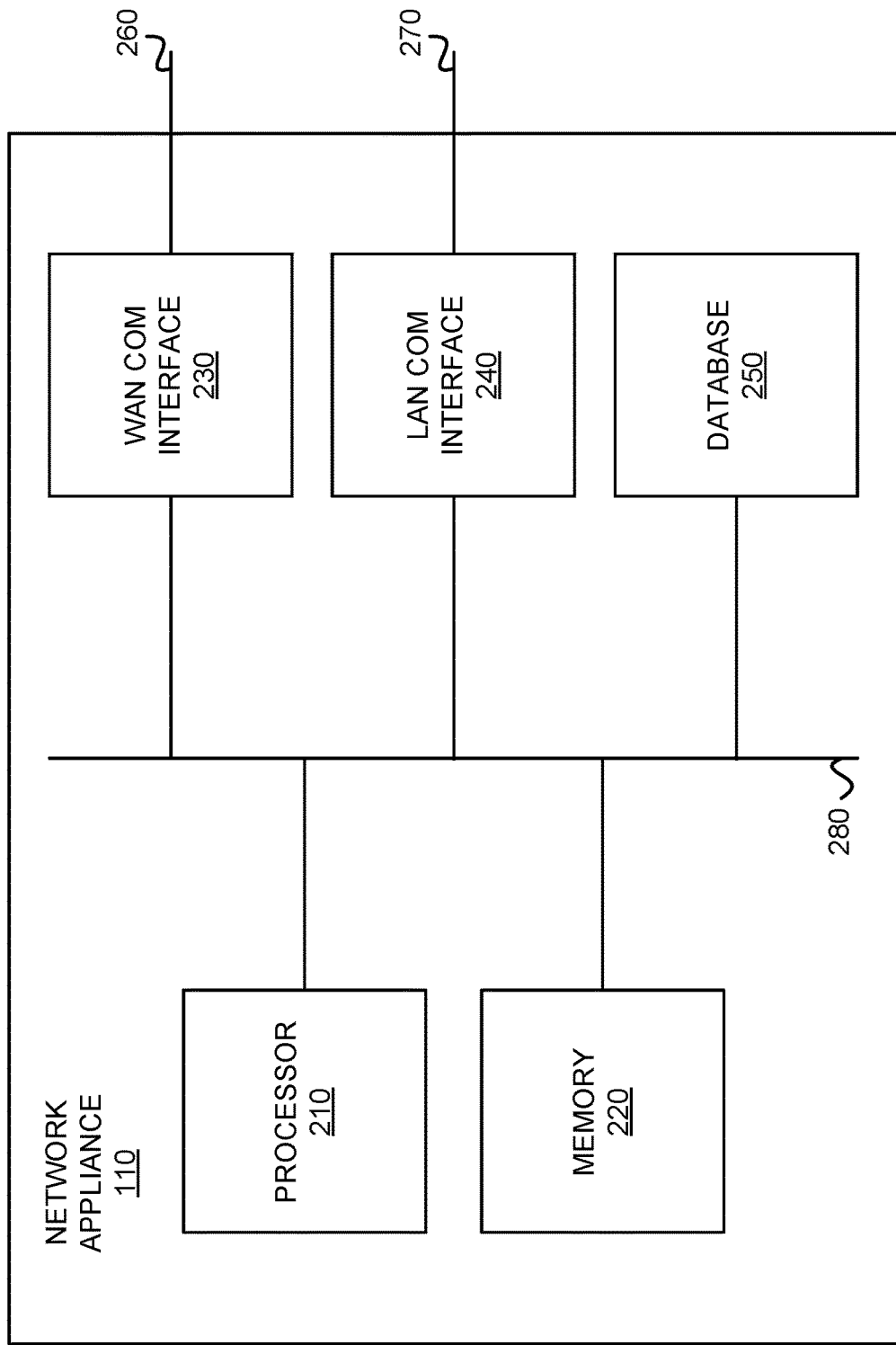
FIG. 2 illustrates a block diagram of a network appliance, in an exemplary implementation of the disclosure.

FIG. 2 illustrates a block diagram of a network appliance 110, in an exemplary implementation of the disclosure. The network appliance 110 includes a processor 210, a memory 220, a WAN communication interface 230, a LAN communication interface 240, and a database 250. A system bus 280 links the processor 210, the memory 220, the WAN communication interface 230, the LAN communication interface 240, and the database 250. Line 260 links the WAN communication interface 230 to another device, such as another appliance, router, or gateway, and line 270 links the LAN communication interface 240 to a user computing device, or other networking device. While network appliance 110 is depicted in FIG. 2 as having these exemplary components, the appliance may have additional or fewer components.

The database 250 comprises hardware and/or software elements configured to store data in an organized format to allow the processor 210 to create, modify, and retrieve the data. The hardware and/or software elements of the database 250 may include storage devices, such as RAM, hard drives, optical drives, flash memory, and magnetic tape.

In some embodiments, some network appliances comprise identical hardware and/or software elements. Alternatively, in other embodiments, some network appliances may include hardware and/or software elements providing additional processing, communication, and storage capacity.

Each network appliance 110 can be in communication with at least one other network appliance 110, whether in the same geographic location, different geographic location, private cloud network, customer datacenter, or any other location. As understood by persons of ordinary skill in the art, any type of network topology may be used. There can be one or more secure tunnels between one or more network appliances. The secure tunnel may be utilized with encryption (e.g., IPsec), access control lists (ACLs), compression (such as header and payload compression), fragmentation/coalescing optimizations and/or error detection and correction provided by an appliance.

A network appliance 110 can further have a software program operating in the background that tracks its activity and performance. For example, information about data flows that are processed by the network appliance 110 can be collected. Any type of information about a flow can be collected, such as header information (source port, destination port, source address, destination address, protocol, etc.), packet count, byte count, timestamp, traffic type, or any other flow attribute. This information can be stored in a flow table 300 at the network appliance 110. Flow tables will be discussed in further detail below, with respect to FIG. 3.

In exemplary embodiments, select information from flow table 300 is aggregated and populated into an accumulating map, which is discussed in further detail below with respect to FIG. 4. Information from the accumulating map is transmitted by network appliance 110 across communication networks(s) 160 to network information collector 180. In this way, the information regarding flows processed by network appliance 110 is not transmitted directly to network information collector 180, but rather a condensed and aggregated version of selected flow information is transmitted across the network, creating less network traffic.

After a flow table 300 is used to populate an accumulating map, or on a certain periodic basis or activation of a condition, flow table 300 may be discarded by network appliance 110 and a new flow table is started. Similarly, after an accumulating map 400 is received by network information collector 180, or on a certain periodic basis or activation of a condition, accumulating map 400 may be discarded by network appliance 110 and a new accumulating map is started.

Returning to FIG. 1B, network information collector 180 comprises hardware and/or software elements, including at least one processor, for receiving data from network appliance 110 and processing it. Network information collector 180 may process data received from network appliance 110 and store the data in database(s) 130. In various embodiments, database(s) 130 is a relational database that stores the information from accumulating map 400. The information can be stored directly into database(s) 130 or separated into columns and then stored in database(s) 130.

Database(s) 130 is further in communication with reporting engine 140. Reporting engine 140 comprises hardware and/or software elements, including at least one processor, for querying data in database(s) 130, processing it, and presenting it to user 150 via a graphical user interface. In this way, user 150 can run any type of query on the stored data. For example, a user can run a query requesting information on the most visited websites, or a "top talkers" report, as discussed in further detail below.

Figure 3:
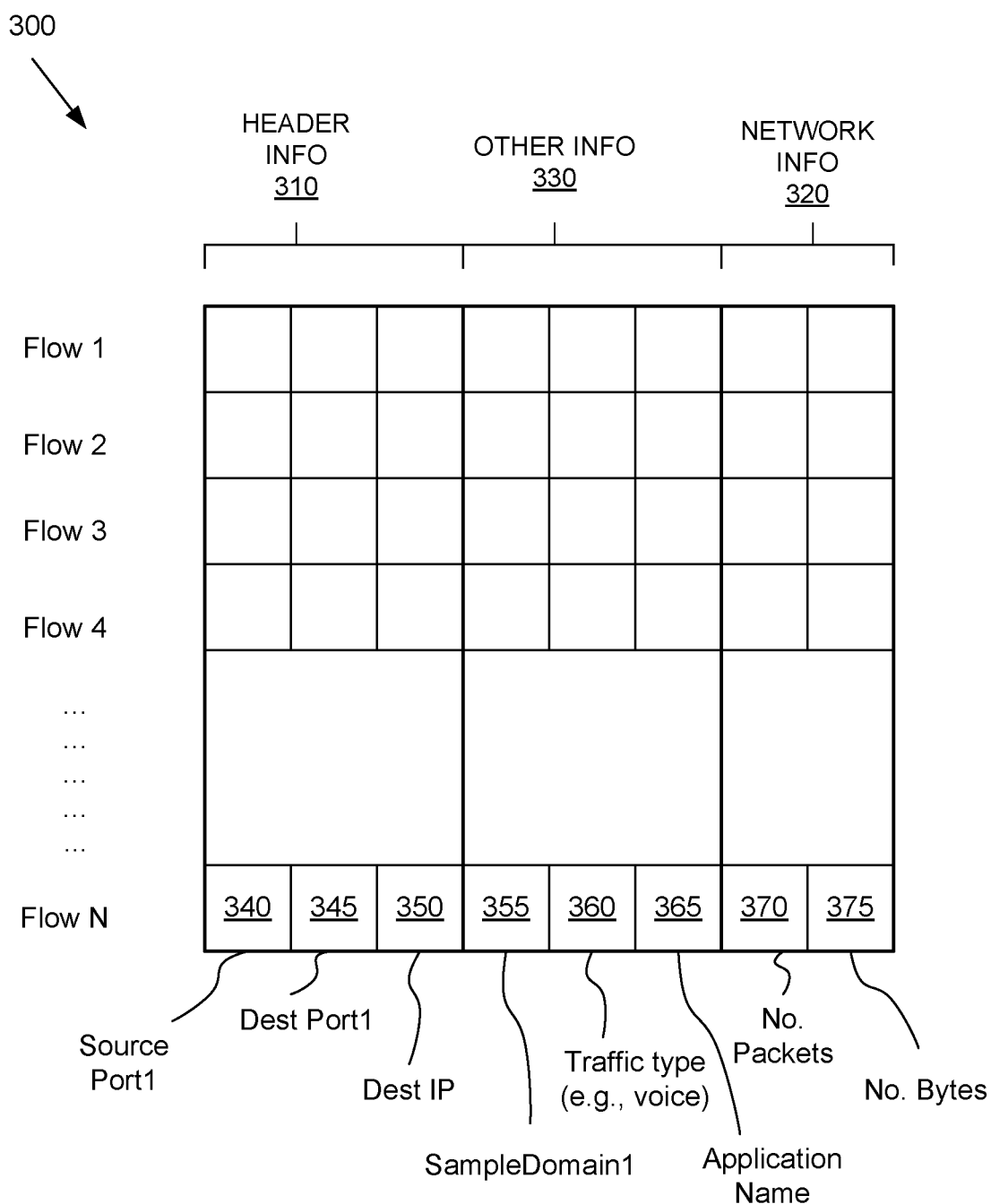
FIG. 3 depicts an exemplary flow table at a network appliance.

FIG. 3 depicts an exemplary flow table 300 at network appliance 110 for flows 1 through N, with N representing any number. The flow table contains one or more rows of information for each flow that is processed through network appliance 110. Data packets transmitted and received between a single user and a single website that the user is browsing can be parsed into multiple flows. Thus, one browsing session for a user on a website may comprise many flows. Typically a TCP flow begins with a SYN packet and ends with a FIN packet. Other methods can be used for determining the start and end of non-TCP flows. The attributes of each of these flows, while they may be identical or substantially similar, are by convention stored in different rows of flow table 300 since they are technically different flows.

In exemplary embodiments, flow table 300 may collect certain information about the flow, such as header information 310, network information 320, and other information 330. As would be understood by a person of ordinary skill in the art, flow table 300 can comprise fewer or additional fields than depicted in FIG. 3. Moreover, even though header information 310 is depicted as having three entries in exemplary flow table 300, there can be fewer or additional entries for header information. Similarly, there can be fewer or additional entries for network information 320 and for other information 330 than the number of entries depicted in exemplary flow table 300.

Header information 310 can comprise any type of information found in a packet header, for example, source port, destination port, source address (such as IP address), destination address, protocol. Network information 320 can comprise any type of information regarding the network, such as a number of bytes received or a number of bytes transmitted during that flow. Further, network information 320 can contain information regarding other characteristics such as loss, latency, jitter, re-ordering, etc. Flow table 300 may store a sum of the number of packets or bytes of each characteristic, or a mathematical operator other than the sum, such as maximum, minimum, mean, median, average, etc. Other information 330 can comprise any other type of information regarding the flow, such as traffic type or domain name (instead of address).

In an example embodiment, entry 340 of flow N is the source port for the flow, entry 345 is the destination port for the flow, and entry 350 is the destination IP address for the flow. Entry 355 is the domain name for the website that flow N originates from or is directed to, entry 360 denotes that the flow is for a voice traffic type, and entry 365 is an application name (for example from deep packet inspection (DPI)). Entry 370 contains the number of packets in the flow and entry 375 contains a number of bytes in the flow.

The flow information regarding every flow is collected by the network appliance 110 at all times, in the background. A network appliance 110 could have one million flows every minute, in which case a flow table for one minute of data for network appliance 110 would have one million rows. Over time, this amount of data becomes cumbersome to process, synthesize, and manipulate. Conventional systems may transport a flow table directly to a flow information collector, or to reduce the amount of data, retain only a fraction of the records from the flow table as a sample. In contrast, embodiments of the present disclosure reduce the amount of data to be processed regarding flows, with minimal information loss, by synthesizing selected information from flow table 300 into an accumulating map. This synthesis can occur on a periodic basis (such as every minute, every 5 minutes, every hour, etc.), or upon the meeting of a condition, such as number of flows recorded in the flow table 300, network status, or any other condition.

FIG. 4A depicts exemplary accumulating maps that are constructed from information from flow table 300. A string of information is built in a hierarchical manner from information in flow table 300. A network administrator can determine one or more strings of information to be gathered. For example, a network administrator may determine that information should be collected regarding a domain name, user computing device, and user computer's port number that is accessing that domain. A user computing device can identify different computing devices utilized by the same user (such as a laptop, smartphone, desktop, tablet, smartwatch, etc.). The user computing device can be identified in any manner, such as by host name, MAC address, user ID, etc.

Exemplary table 400 has rows 1 through F, with F being any number, for the hierarchical string "/domain name/computer/port" that is built from this information. Since the accumulating map 400 is an aggregation of flow information, F will be a much smaller value than N, the total number of flows from flow table 300.

Exemplary table 450 shows data being collected for a string of source IP address and destination IP address combinations. Thus, information regarding which IP addresses are communicating with each other is accumulated. Network appliance 110 can populate an accumulating map for any number of strings of information from flow table 300. In an exemplary embodiment, network appliance 110 populates multiple accumulating maps, each for a different string hierarchy of information from flow table 300. While FIG. 4A depicts only two string hierarchies, there can be fewer or additional strings of information collected in accumulating maps.

Row 410 in exemplary accumulating map 400 shows that during the time interval represented, sampledomain1 was accessed by computer1 from port 1. All of the flows where sampledomain1 was accessed by computer1 from port1 in flow table 300 are aggregated into a single row, row 410, in accumulating map 400. The network information 320 may be aggregated for the flows to depict a total number of bytes received and a total number of packets received from sampledomain1 accessed by computer1 via port1 during the time interval of flow table 300. In this way, a large number of flows may be condensed into a single row in accumulating map 400.

As would be understood by a person of ordinary skill in the art, while accumulating map 400 depicts a total number of bytes received and a total number of packets received (also referred to herein as a network characteristic), any attribute can be collected and aggregated into accumulating map 400. For example, instead of a sum of bytes received, accumulating map 400 can track a maximum value, minimum value, median, percentile, or other numeric attribute for a string. Additionally, the network characteristic can be other characteristics besides number of packets or number of bytes. Loss, latency, re-ordering, and other characteristics can be tracked for a string in addition to, or instead of, packets and bytes, such as number of flows that are aggregated into the row. For example, packet loss and packet jitter can be measured by time stamps and serial numbers from the flow table. Additional information on measurement of network characteristics can be found in commonly owned U.S. Pat. No. 9,143,455 issued on Sep. 22, 2015 and entitled "Quality of Service Using Multiple Flows", which is hereby incorporated herein in its entirety.

Row 430 shows that the same computer (computer1) accessed the same domain name (sampledomain1), but from a different port (port2). Thus, all of the flows in flow table 300 from port2 of computer1 to sampledomain1 are aggregated into row 430. Similarly, accumulating map 400 can be populated with information from flow table 300 for any number of domains accessed by any number of computers from any number of ports, as shown in row 440.

Flow table 300 may comprise data for one time interval while accumulating map 400 can comprise data for a different time interval. For example, flow table 300 can comprise data for all flows through network appliance 110 over the course of a minute, while data from 60 minutes can all be aggregated into one accumulating map. Thus, if a user returns to the same website from the same computer from the same port within the same hour, even though this network traffic is on a different flow, the data can be combined with the previous flow information for the same parameters into the accumulating map. This significantly reduces the number of records that are maintained. All activity between a computer and a domain from a certain port is aggregated together as one record in the accumulating map, instead of multiple records per flow. This provides information in a compact manner for further processing, while also foregoing the maintenance of all details about more specific activities.

Exemplary accumulating map 450 depicts flow information for another string source IP address and destination IP address combinations. In IPv4 addressing alone, there are four billion possibilities for source IP addresses and four billion possibilities for destination IP addresses. To maintain a table of all possible IP address combinations between these would be an unwieldy table of information to collect. Further, most combinations for a particular network appliance 110 would be zero. Thus, to maintain large volumes of data in a scalable way, the accumulating map 450 only collects information regarding IP addresses actually used as a source or destination, instead of every possible combination of IP addresses.

The accumulating map 450 can be indexed in different indexing structures, as would be understood by a person of ordinary skill in the art. For example, a hash table can be used where the key is the string and a hash of the string is computed to find a hash bin. In that bin is a list of strings and their associated values. Furthermore, there can be additional indexing to make operations (like finding smallest value) fast, as discussed herein. An accumulating map may comprise the contents of the table, such as that depicted in 400 and 450, and additionally one or more indexing structures and additional information related to the table. In some embodiments, only the table itself from the accumulating map may be transmitted to network information collector 180.

The information from an accumulating map can be collected from the network appliances and then stored in database(s) 130, which may be a relational database. The scheme can use raw aggregated strings and corresponding values in columns of the database(s) 130, or separate columns can be used for each flow attribute of the string and its corresponding values. For example, port, computer, and domain name can all be separate columns in a relational database, rather than stored as one column for the string.

The reporting engine 140 allows a user 150 or network administrator to run a query and generate a report from information in accumulating maps that was stored in database(s) 130. For example, a user 150 can query which websites were visited by searching "/domain/*". A user 150 can query the top traffic types by searching "/*/traffic type". Multi-dimensional searches can also be run on data in database(s) 130. For example, who are they top talkers and which websites are they visiting? For the top destinations, who is going there? For the top websites, what are the top traffic types? A network administrator can configure the system to aggregate selected flow information based specifically on the most common types of queries that are run on network data. Further, multi-dimensional queries can be run on this aggregated information, even though the data is not stored in a multi-dimensional format (such as a cube).

Further, by collecting flow information for a certain time interval inflow table 300 (e.g., once a minute), and aggregating selected flow information into one or more accumulating maps for a set time interval (e.g., once an hour) at the network appliance 110, only relevant flow information is gathered by network information collector 180 and maintained in database(s) 130. This allows for efficient scalability of a large number of network appliances in a WAN, since the amount of information collected and stored is significantly reduced, compared to simply collecting and storing all information about all flows through every network appliance for all time. Through an accumulating map, information can be aggregated by time, appliance, traffic type, IP address, website/domain, or any other attribute associated with a flow.

While the strings of an accumulating map are depicted herein with slashes, the information can be stored in an accumulating map in any format, such as other symbols or even no symbol at all. A string can be composed of binary records joined together to make a string, or normal ASCII text, Unicode text, or concatenations thereof. For example, row 410 can be represented as "sampledomain1, computer1, port1" or in any number of ways. Further, instead of delimiting a string by characters, it can be delimited by links and values. Information can also be sorted lexicographically.

Figure 4B:
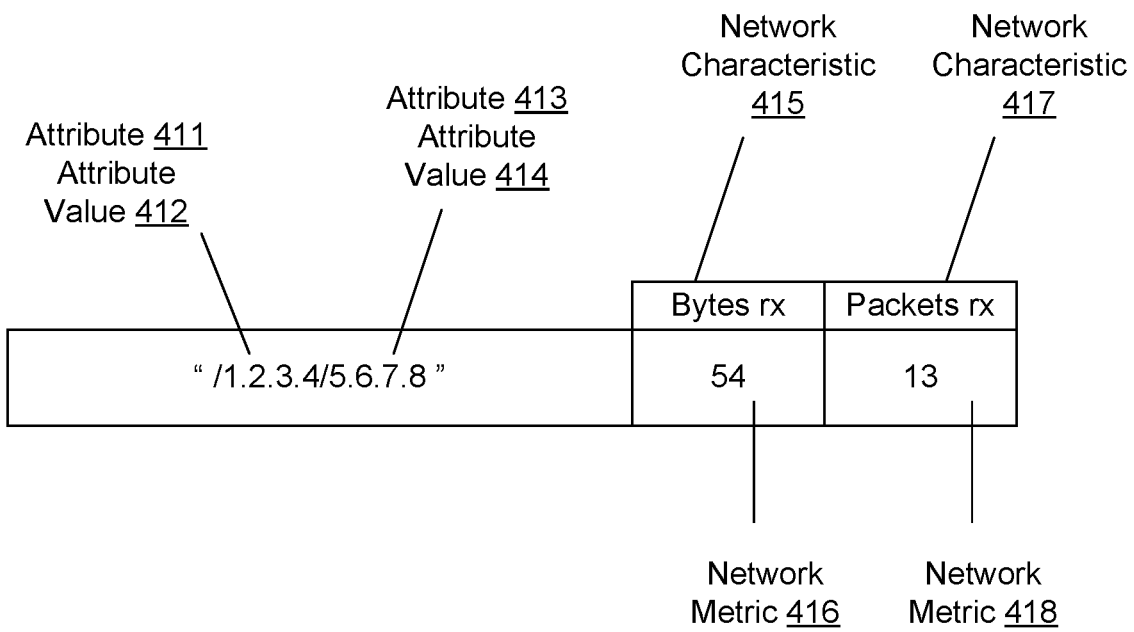
FIG. 4B depicts exemplary information from a row of an accumulating map.
Figure 4B:
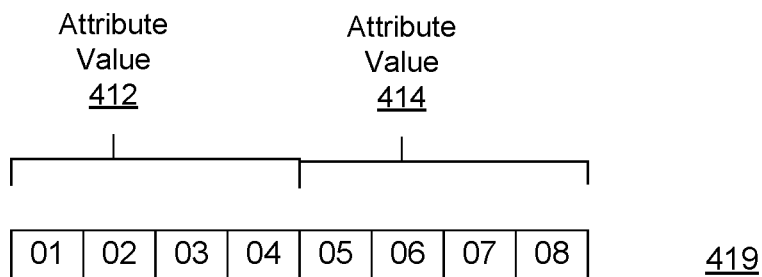

FIG. 4B depicts exemplary information from a row of an accumulating map. A string is composed of an attribute value 412 (such as 1.2.3.4) of a first attribute 411 (such as source IP address), and an attribute value 414 (such as 5.6.7.8) of a second attribute 413 (such as destination IP address). For each string of information, there is an associated network characteristic 415 (such as number of bytes received) and its corresponding network metric 416 (such as 54) and there can optionally be a second network characteristic 417 (number of packets received) and its corresponding network metric 418 (such as 13). While two network characteristics are depicted here, there can be only one network characteristic or three or more network characteristics. Similarly, there can be fewer or additional attributes in a string. This information can also be stored as a binary key string 419 as depicted in the figure.

Furthermore, while data is discussed herein as being applicable to a particular flow, a similar mechanism can be utilized to gather data for a tunnel, instead of just a flow. For example, a string of information comprising "/tunnelname/application/website" can be gathered in an accumulating map. In this way, information regarding which tunnel a flow goes into and which application is using that tunnel can be collected and stored. Data packets can be encapsulated into tunnel packets, and a single string may collect information regarding each of these packets as a way of tracking tunnel performance.

In various embodiments, an accumulating map, such as map 400, can have a maximum or target number of rows or records that can be maintained. Since one purpose of the accumulating map is to reduce the amount of flow information that is collected, transmitted, and stored, it can be advantageous to limit the size of the accumulating map. Once a defined number of records is reached, then an eviction policy can be applied to determine how new entries are processed. The eviction policy can be triggered upon reaching a maximum number of records, or upon reaching a lower target number of records.

In one eviction policy, any new strings of flow information that are not already in the accumulating map will simply be discarded for that time interval, until a new accumulating map is started for the next time interval.

In a second eviction policy, the strings of information that constitute overflow are summarized into a log file, called an eviction log. The eviction log can be post-processed and transmitted to the network information collector 180 at substantially the same time as information from the accumulating map. Alternatively, the eviction log may be consulted only at a later time when further detail is required.

In a third eviction policy, when anew string needs to be added to an accumulating map, then an existing record can be moved from the accumulating map into an eviction log to make space for the new string which is then added to the accumulating map. The determination of which existing record to purge from the accumulating map can be based on a metric. For example, the existing entry with the least number of bytes received can be evicted. In various embodiments there can also be a time parameter for this so that new strings have a chance to aggregate and build up before automatically being evicted for having the lowest number of bytes. That is, to avoid a situation where the newest entry is constantly evicted, a time parameter can be imposed to allow for any desired aggregation of flows for the string.

In some embodiments, to find the existing entry with the least number of bytes to be evicted, the whole accumulating map can be scanned. In other embodiments, the accumulating map is already indexed (such as via a hash table) so it is already sorted and the lowest value can be easily found.

Figure 5A:
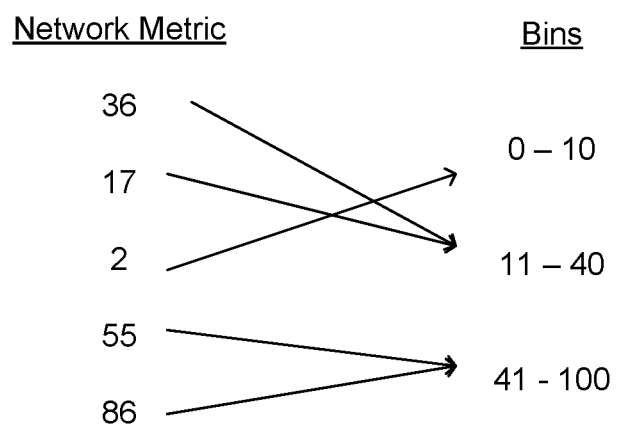
FIG. 5A depicts an exemplary sorting via bins for an accumulating map.

In further embodiments, information from an accumulating map can be stored in bins such as those depicted in FIG. 5A. In the exemplary embodiment of FIG. 5A, aggregated network metric values of a network characteristic are displayed, and bins are labeled with various numeric ranges, such as 0-10, 11-40 and 41-100. Each network metric is associated with the bin of its numeric range. Thus strings and their corresponding aggregated values can be placed in an indexing structure for the accumulating map in accordance with the metric value of their corresponding network characteristic. As a network metric increases (for example from new flows being aggregated into the string), or as a network metric decreases (for example from some strings being evicted), then the entry can be moved to a different bin in accordance with its new numeric range. In an exemplary embodiment, the table of an accumulating map is a first data structure, a bin is a second data structure, and sorting operations can be conducted in a third data structure.

Placing data from accumulating map 400 in bins allows for eviction to occur from the lowest value bin with data. Any record can be evicted from the lowest value bin with data, or the lowest value bin can be scanned to find the entry with the lowest network metric for eviction.

The bins can also be arranged in powers of two to cover bigger ranges of values. For example, bins can have ranges of 0-1, 2-3, 4-7, 8-15, 16-31, 32-63, 64-127 and so on. In this way, the information from accumulating map doesn't need to be kept perfectly sorted by network metric, which can require a significant amount of indexing.

Figure 5B:
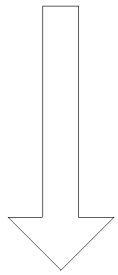
FIG. 5B depicts an exemplary eviction policy for an accumulating map.

In another exemplary embodiment, space can be freed up in an accumulating map by combining multiple records that have common attributes. For example, in the accumulating map of FIG. 5B, there are two entries with the same domain and computer, but different port numbers. The data from these entries can be combined by keeping the domain and computer in the string, but removing the port numbers. In this way, two or more records in the accumulating map with common flow attributes can be aggregated into one record by removing the uncommon attributes from the record. The bytes received and packets received for the new condensed record is an aggregation of the previous separate records. In this way, some information may be lost from the accumulating map (through loss of some granularity), but by least importance as defined by the combination of attributes in the string (by removing a lower level but keeping a higher level of information in the string). Alternatively, of the two entries with the same domain and computer but different port numbers, the record with the lowest number of bytes may simply be evicted from the accumulating map and added to the eviction log. There can also be a time interval allotted to the record before it is evicted to allow flow data to be aggregated for that string before eviction.

In a fourth eviction policy, a batch eviction can be conducted on the accumulating map to free up space. For example, a determination may be made of which records are the least useful and then those are evicted from the accumulating map and logged in the eviction log. In an exemplary embodiment, an accumulating map may be capable of having 10,000 records. A batch eviction may remove 1,000 records at a time. However, any number of records can be moved in a batch eviction process, and an accumulating map size can be set to any number of records. A batch eviction can also remove one or more bins of information.

Figure 6:
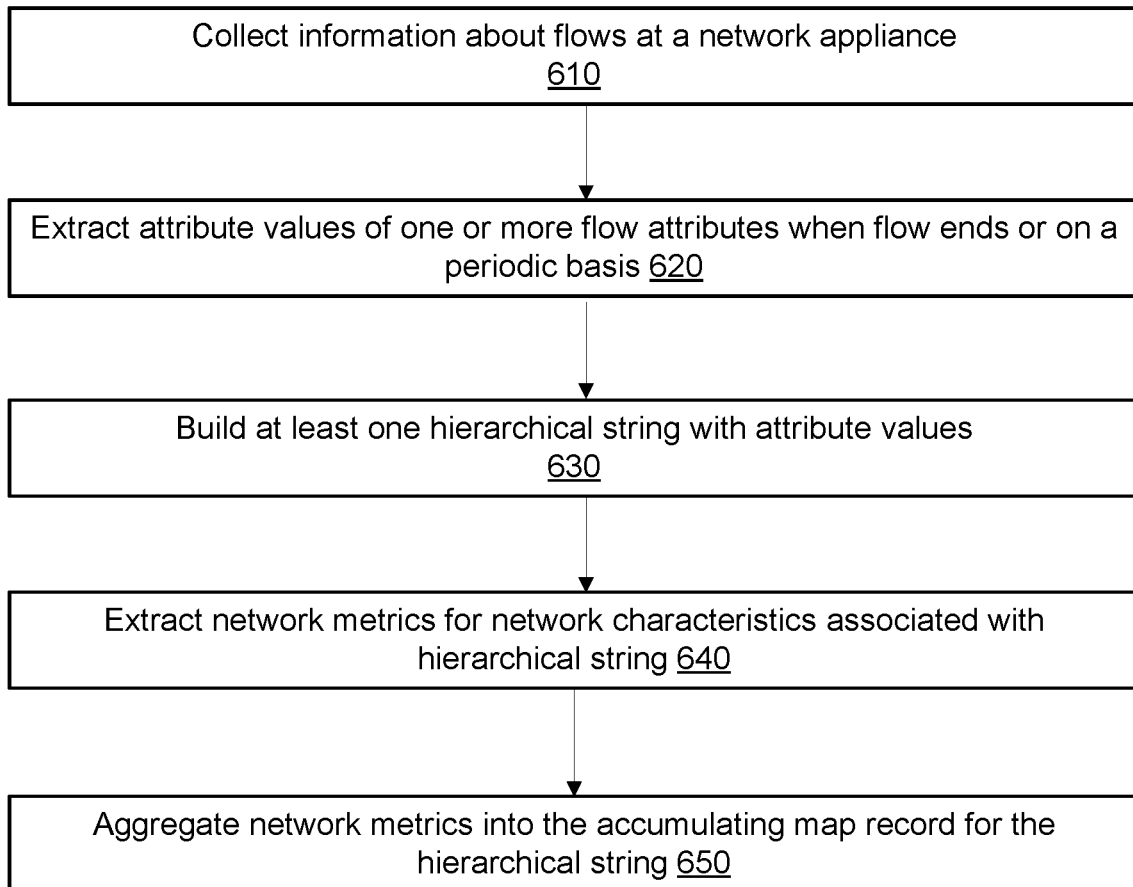
FIG. 6 depicts an exemplary method for building a hierarchical string.

FIG. 6 depicts an exemplary method for building a hierarchical string and aggregating the associated values, as discussed herein. In step 610, information about network traffic flows is collected at a network appliance. In step 620, an attribute value of a first attribute (or flow attributes) is extracted when the flow ends, or on a periodic basis. For example, if a flow attribute is source IP address, then the attribute value of the source IP address (such as 1.2.3.4) is extracted. An attribute value of a second flow attribute can also be extracted. There can be any number of flow attributes extracted from flow information. In step 630, at least one hierarchical string is built with the extracted attribute values. For example, source IP may be a part of only one, or multiple different hierarchical strings. Network metric(s) for the associated network characteristic(s) of the hierarchical string(s) are extracted in step 640, and the network metrics are aggregated for the different flows into an accumulating map record for each hierarchical string in step 650. For example, a string of "/source IP/destination IP" can be built from the various source and destination IP address combinations with the aggregated network metrics of the network characteristic of number of bytes exchanged between each source IP and destination IP combination.

The aggregated information may be sent from each network device to the network information collector 180 as discussed herein. The information can be transmitted as raw data, or may be subjected to processing such as encryption, compression, or other type of processing. The network information collector 180 may initiate a request for the data from each network appliance, or the network appliance may send it automatically, such as on a periodic basis after the passage of a certain amount of time (for example, every minute, every 5 minutes, every hour, etc.).

While the method has been described in these discrete steps, various steps may occur in a different order, or concurrently. Further, this method may be practiced for each incoming flow or outgoing flow of a network appliance.

Thus, methods and systems for aggregated select network traffic statistics are disclosed. Although embodiments have been described with reference to specific examples, it will be evident that various modifications and changes can be made to these example embodiments without departing from the broader spirit and scope of the present application. Therefore, these and other variations upon the exemplary embodiments are intended to be covered by the present disclosure. Accordingly, the specification and drawings are to be regarded in an illustrative rather than a restrictive sense.

What is claimed is:

1. A method for generating network traffic statistics comprising:

receiving, at a network information collector device via a network, an accumulating map from a network appliance device, wherein the accumulating map comprises a condensed and aggregated version of web traffic flow information to the network appliance device, the accumulating map being generated by:

for each flow from a first network appliance device, extracting a first attribute value of a first flow attribute, for each flow from the first network appliance device, extracting a second attribute value of a second flow attribute, building a hierarchical string with the extracted first attribute value and the extracted second attribute value, wherein the hierarchical string represents a subset of the network traffic statistics collected for the first network appliance device, and the second attribute of the hierarchical string is more specific than the first attribute of the hierarchical string, extracting at least one network metric for at least one network characteristic associated with the at least one hierarchical string, aggregating the at least one network metric for the at least one network characteristic over a plurality of flows to and from the first network appliance device in the network, implementing an eviction policy on lower level records and aggregating the lower level records into a higher level record of the hierarchical string, and generating the accumulating map that is updated in substantially real time, the accumulating map comprising the at least one hierarchical string and associated aggregated network metrics for the first flow attribute and the second flow attribute of the hierarchical string, the accumulating map being limited to a defined number of entries for a specified time period, and the defined number of entries for the specified time period reducing an amount of the web traffic flow information collected;

receiving, at the network information collector device via the network, additional accumulating maps from other network appliance devices;

populating an accumulation map database with the accumulating map and the additional accumulating maps; and generating a report of the network traffic statistics hosted by the network appliance device and the other network appliance devices.

2. The method of claim 1, wherein the accumulation map is encrypted and the method further comprises:

decrypting the accumulation map prior to populating the accumulation map database.

3. The method of claim 1, wherein the accumulation map is compressed and the method further comprises:

initiating a request for additional data from the network appliance device and the other network appliance devices based on the compression.

4. The method of claim 1, wherein the accumulating map is generated using the eviction policy that removes at least some of the web traffic flow information.

5. The method of claim 4, wherein the eviction policy is a batch eviction of the web traffic flow information.

6. The method of claim 1, wherein the accumulating map comprises an eviction log for collected information in excess of a target number of entries for the specified time period, the eviction log comprising a strings of information in excess of the target number of entries for the specified time period.

7. A network information collector for generating network traffic statistics, the network information collector to:

receive, via a network, an accumulating map from a network appliance device, wherein the accumulating map comprises a condensed and aggregated version of web traffic flow information to the network appliance device, the accumulating map being generated by:

for each flow from a first network appliance device, extracting a first attribute value of a first flow attribute, for each flow from the first network appliance device, extracting a second attribute value of a second flow attribute, building at least one hierarchical string with the extracted first attribute value and the extracted second attribute value, wherein the hierarchical string represents a subset of the network traffic statistics collected for the first network appliance device, and the second attribute of the hierarchical string is more specific than the first attribute of the hierarchical string, extracting at least one network metric for at least one network characteristic associated with the at least one hierarchical string, aggregating the at least one network metric for the at least one network characteristic over a plurality of flows to and from the first network appliance device in the network, implementing an eviction policy on lower level records and aggregating the lower level records into a higher level record of the hierarchical string, and generating the accumulating map that is updated in substantially real time, the accumulating map comprising the at least one hierarchical string and associated aggregated network metrics for the first flow attribute and the second flow attribute of the hierarchical string, the accumulating map being limited to a defined number of entries for a specified time period, and the defined number of entries for the specified time period reducing an amount of the web traffic flow information collected; receive, via the network, additional accumulating maps from other network appliance devices; populate an accumulation map database with the accumulating map and the additional accumulating maps; and generate a report of the network traffic statistics hosted by the network appliance device and the other network appliance devices.

8. The network information collector of claim 7, wherein the accumulation map is encrypted and the network information collector further to:
   decrypt the accumulation map prior to populating the accumulation map database.

9. The network information collector of claim 7, wherein the accumulation map is compressed and the network information collector further to:
   initiate a request for additional data from the network appliance device and the other network appliance devices based on the compression.

10. The network information collector of claim 7, wherein the accumulating map is generated using the eviction policy that removes at least some of the web traffic flow information.

11. The network information collector of claim 10, wherein the eviction policy is a batch eviction of the web traffic flow information.

12. The network information collector of claim 7, wherein the accumulating map comprises an eviction log for collected information in excess of a target number of entries for the specified time period, the eviction log comprising a strings of information in excess of the target number of entries for the specified time period.

13. A non-transitory computer-readable storage medium storing a plurality of instructions executable by one or more processors, the plurality of instructions when executed by the one or more processors cause the one or more processors to:
   receive, via a network, an accumulating map from a network appliance device, wherein the accumulating map comprises a condensed and aggregated version of web traffic flow information to the network appliance device, the accumulating map being generated by:
      for each flow from a first network appliance device, extracting a first attribute value of a first flow attribute,
      for each flow from the first network appliance device, extracting a second attribute value of a second flow attribute,
      building at least one hierarchical string with the extracted first attribute value and the extracted second attribute value, wherein the hierarchical string represents a subset of the network traffic statistics collected for the first network appliance device, and the second attribute of the hierarchical string is more specific than the first attribute of the hierarchical string, extracting at least one network metric for at least one network characteristic associated with the at least one hierarchical string, aggregating the at least one network metric for the at least one network characteristic over a plurality of flows to and from the first network appliance device in the network, implementing an eviction policy on lower level records and aggregating the lower level records into a higher level record of the hierarchical string, and generating the accumulating map that is updated in substantially real time, the accumulating map comprising the at least one hierarchical string and associated aggregated network metrics for the first flow attribute and the second flow attribute of the hierarchical string, the accumulating map being limited to a defined number of entries for a specified time period, and the defined number of entries for the specified time period reducing an amount of the web traffic flow information collected; receive, via the network, additional accumulating maps from other network appliance devices; populate an accumulation map database with the accumulating map and the additional accumulating maps; and generate a report of the network traffic statistics hosted by the network appliance device and the other network appliance devices.

14. The computer-readable storage medium of claim 13, wherein the accumulation map is encrypted and the one or more processors further to:
   decrypt the accumulation map prior to populating the accumulation map database.

15. The computer-readable storage medium of claim 13, wherein the accumulation map is compressed and the one or more processors further to:
   initiate a request for additional data from the network appliance device and the other network appliance devices based on the compression.

16. The computer-readable storage medium of claim 13, wherein the accumulating map is generated using the eviction policy that removes at least some of the web traffic flow information, and wherein the eviction policy is a batch eviction of the web traffic flow information.

17. The computer-readable storage medium of claim 13, wherein the accumulating map comprises an eviction log for collected information in excess of a target number of entries for the specified time period, the eviction log comprising a strings of information in excess of the target number of entries for the specified time period.

18. The method of claim 1, wherein the accumulation map comprises an aggregated packet loss associated with a hierarchical domain string in the web traffic flow information.

19. The method of claim 1, wherein the accumulation map comprises one aggregated entry for the network appliance device and a particular port within the specified time period.

20. The method of claim 1, wherein the accumulation map comprises the web traffic flow information and one or more indexing structures.

* * * * *